United States Patent
Usuda et al.

(10) Patent No.: US 9,948,228 B2
(45) Date of Patent: Apr. 17, 2018

(54) MOTOR DRIVING METHOD, BATTERY PACK AND SEMICONDUCTOR DEVICE

(71) Applicant: Renesas Electronics Corporation, Koutou-ku, Tokyo (JP)

(72) Inventors: Yasuo Usuda, Tokyo (JP); Yusuke Sugawara, Tokyo (JP); Yoshitaro Kondo, Tokyo (JP); Masaki Hogari, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 53 days.

(21) Appl. No.: 15/242,504

(22) Filed: Aug. 20, 2016

(65) Prior Publication Data

US 2017/0093320 A1  Mar. 30, 2017

(30) Foreign Application Priority Data

Sep. 29, 2015 (JP) ................. 2015-192254

(51) Int. Cl.
*H02P 27/08* (2006.01)
*H02J 7/00* (2006.01)
*H02P 6/14* (2016.01)

(52) U.S. Cl.
CPC ............ *H02P 27/08* (2013.01); *H02J 7/0021* (2013.01); *H02J 7/0024* (2013.01); *H02J 7/0077* (2013.01); *H02P 6/14* (2013.01)

(58) Field of Classification Search
CPC ...................................................... H02P 27/08
USPC ..................................................... 318/139, 34
See application file for complete search history.

(56) References Cited

U.S. PATENT DOCUMENTS 6,864,646 B2 * 3/2005 Rahman ................. H02P 23/06
                                                                   318/41
7,071,639 B2   7/2006 Ochiai et al.

FOREIGN PATENT DOCUMENTS

| JP | 2003-209999 A | 7/2003 |
| JP | 2006-136066 A | 5/2006 |
| JP | 2009-144549 A | 7/2009 |
| JP | 2011-072169 A | 4/2011 |
| WO | WO 2009/075271 A1 | 6/2009 |

* cited by examiner

*Primary Examiner* — David S Luo
(74) *Attorney, Agent, or Firm* — Shapiro, Gabor and Rosenberger, PLLC

(57) ABSTRACT

The present invention provides a motor driving method, a battery pack, and a semiconductor device capable of variable-controlling a bus voltage from a battery pack. A battery pack outputting a bus voltage to a positive voltage node using a negative voltage node as a reference, an inverter unit converting the bus voltage to AC voltage by switching according to a PWM signal and driving a motor, and a motor control unit generating the PWM signal are used. The motor control unit outputs a voltage instruction signal for instructing the bus voltage toward the battery pack. The battery pack variable-controls the number of cells coupled in parallel between the positive voltage node and the negative voltage node so as to obtain the bus voltage according to the voltage instruction signal.

20 Claims, 19 Drawing Sheets

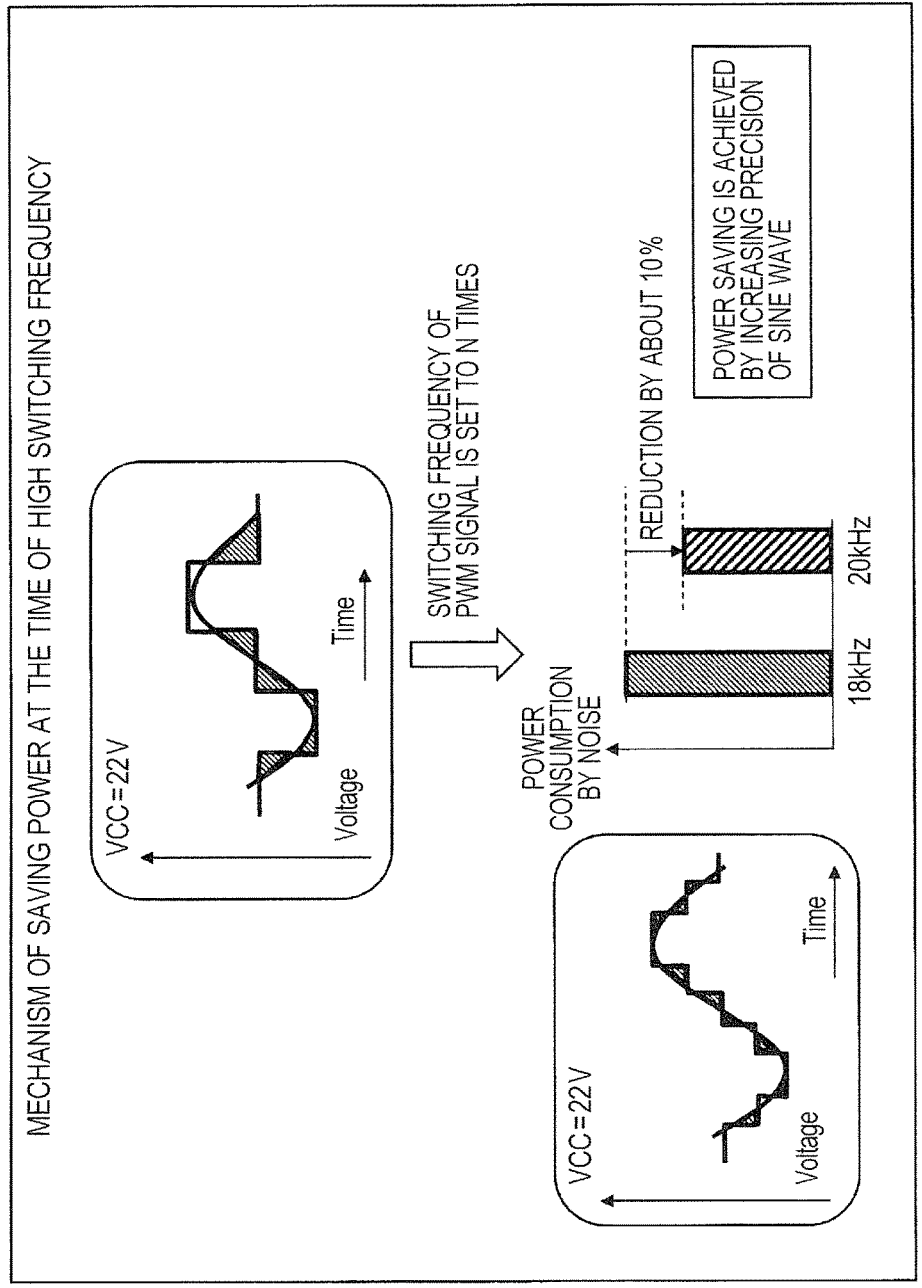

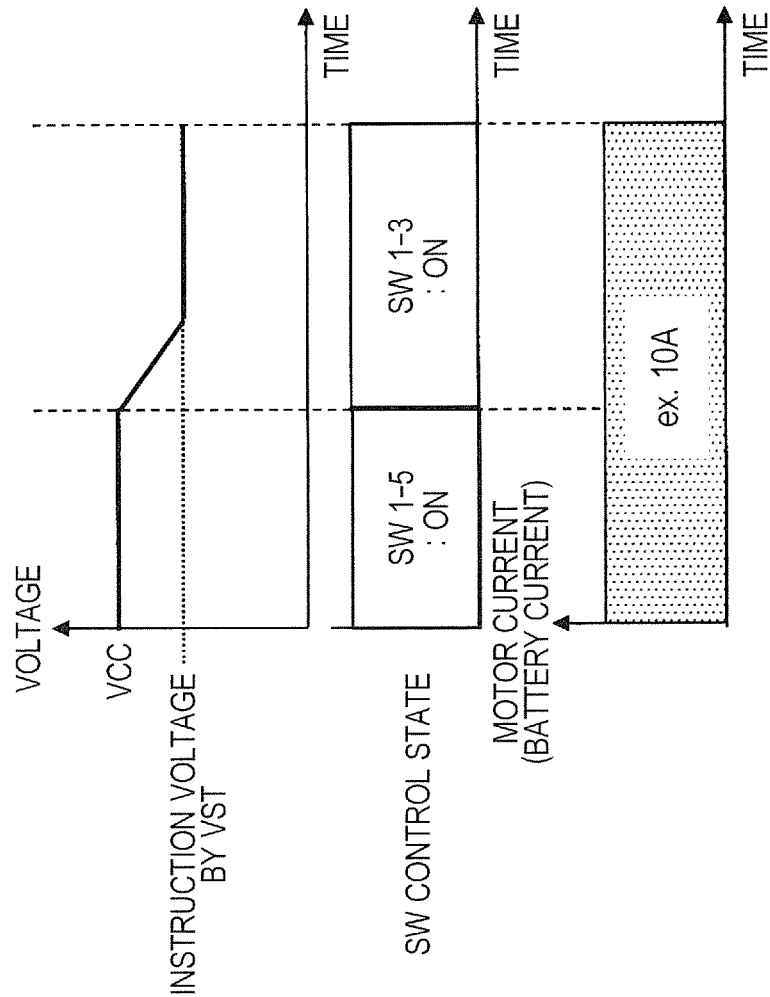

MOTOR DRIVING METHOD, BATTERY PACK AND SEMICONDUCTOR DEVICE

CROSS-REFERENCE TO RELATED APPLICATIONS

The disclosure of Japanese Patent Application No. 2015-192254 filed on Sep. 29, 2015 including the specification, drawings and abstract is incorporated herein by reference in its entirety.

BACKGROUND

The present disclosure relates to a motor driving method, a battery pack, and a semiconductor device and relates to, for example, a technique at the time of driving a motor by a PWM (Pulse Width Modulation) signal by using power from a battery pack and a technique of a control IC (Integrated Circuit) provided in the battery pack.

For example, patent literature 1 discloses a configuration in which a switch for charging/discharging is coupled to each of electric cells in parallel in an assembled battery in which a plurality of electric cells are coupled in series. Patent literatures 2, 3, and 4 disclose a technique of providing a DC/DC converter circuit and an inverter circuit and controlling a motor by using PWM control or PAM (Pulse Amplitude Modulation).

RELATED ART LITERATURE

Patent Literature

Patent Literature 1: Japanese Unexamined Patent Application Publication No. 2011-72169
Patent Literature 2: Japanese Unexamined Patent Application Publication No. 2009-144549
Patent Literature 3: Japanese Unexamined Patent Application Publication No. 2006-136066
Patent Literature 4: Japanese Unexamined Patent Application Publication No. 2003-209999

SUMMARY

For example, a system represented by a home appliance in which a motor is driven from a battery pack via an inverter circuit is used. The inverter circuit receives a bus voltage as a fixed value from the battery pack and supplies a predetermined power to the motor by using PWM control or the like. However, by examination of the inventors of the present invention, it was found that when the bus voltage is a fixed value, power saving and the like may not be sufficiently achieved.

Embodiments to be described later are made in view of the problem, and the other problems and novel features will become apparent from the description of the specification and the appended drawings.

A motor driving method as an embodiment is executed by using: a battery pack outputting a bus voltage to a positive voltage node using a negative voltage node as a reference; an inverter unit converting the bus voltage to an AC voltage by switching according to a PWM signal, and a motor control unit generating the PWM signal. The motor control unit outputs a voltage instruction signal for instructing the bus voltage toward the battery pack. The battery pack variable-controls the number of cells coupled in parallel between the positive voltage node and the negative voltage node so that the bus voltage according to the voltage instruction signal is obtained.

According to the embodiment, the bus voltage from the battery pack can be variable-controlled.

BRIEF DESCRIPTION OF THE DRAWINGS

FIG. 7 is an explanatory diagram related to power saving achieved when the motor driving system in FIGS. 1 and 4 is used.

FIG. 13A is a schematic diagram illustrating a structure example of an internal resistance table in FIG. 12, and FIG. 13B is an explanatory diagram illustrating an operation example of a voltage setting unit in FIG. 12.

DETAILED DESCRIPTION

Figure 1:
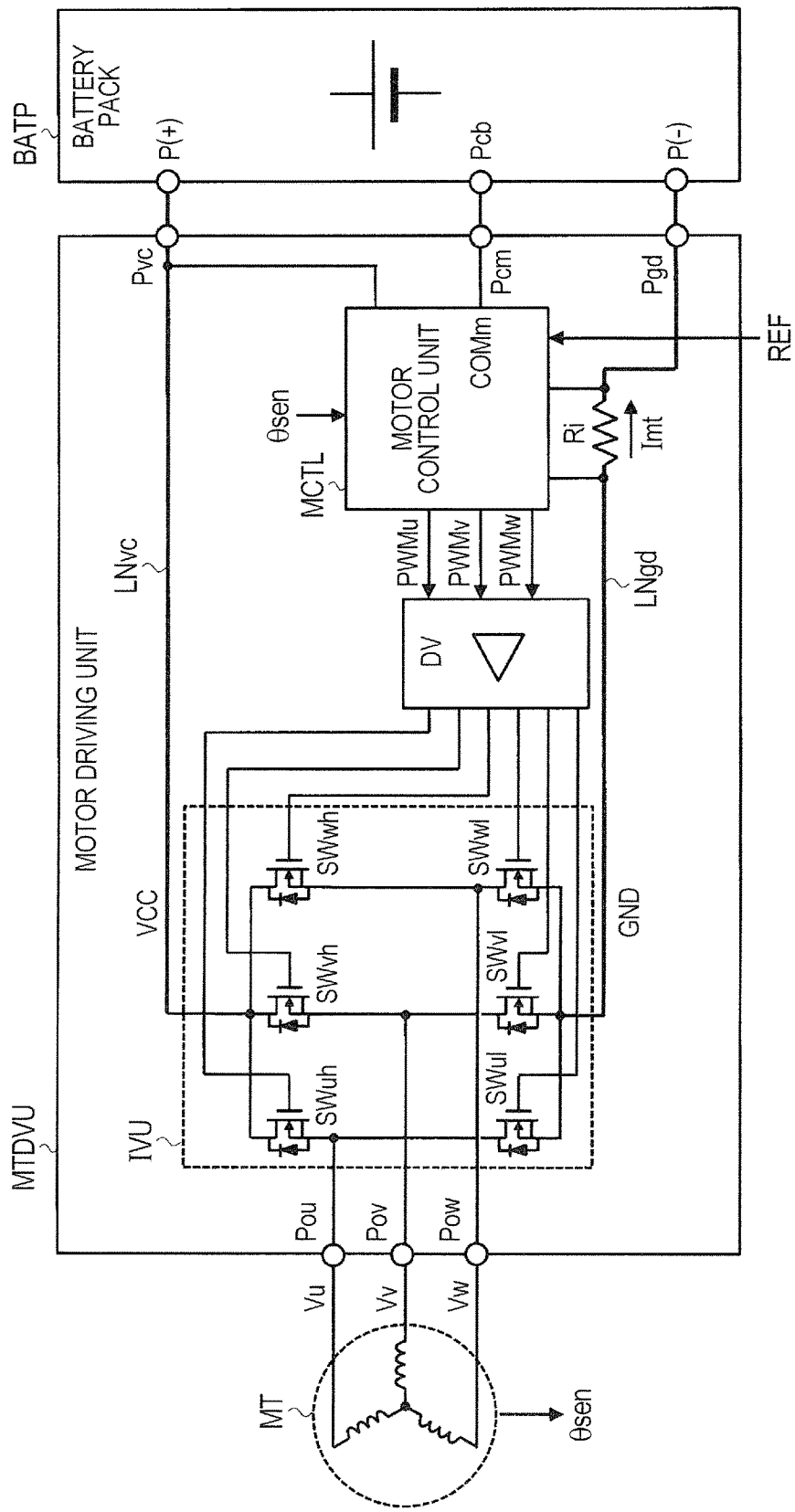
FIG. 1 is a schematic diagram illustrating a configuration example of a motor driving system according to a first embodiment of the present invention.

In the following embodiments, when it is necessary for convenience, an embodiment will be described by being divided to a plurality of sections or examples. Unless otherwise clearly specified, they are not non-related but have relations such as modification, detailed description, and supplementary explanation in which one is a part or all of the other. In the following embodiments, in the case of mentioning the number of elements and the like (including the number of pieces, numerical value, quantity, and range), except for the case where it is clearly mentioned, the case where the invention is principally clearly limited to a specific value, and the like, the invention is not limited to the specific value. The number may be larger or smaller than the specific value.

Further, in the following embodiments, obviously, components (including operation steps) are not always necessary except for the case where it is clearly mentioned, the case where it is considered that a component is principally clearly necessary, and the like. Similarly, in the following embodiments, when shape, position relation, and the like of components are mentioned, they substantially include shape and the like close or similar to them except for the case where it is clearly mentioned, the case where it is considered that the shape and the like are not principally clearly similar. The numerical value and range are also similar to the above.

Hereinafter, embodiments of the present invention will be described in detail with reference to the drawings. In all of the drawings for explaining the embodiments, in principle, the same reference numerals are designated to the same members and repetitive description will not be given.

First Embodiment

Schematic Configuration of Motor Driving System

FIG. 1 is a schematic diagram illustrating a configuration example of a motor driving system according to a first embodiment of the present invention. A motor driving system illustrated in FIG. 1 has a battery pack BATP, a motor driving unit MTDVU, and a motor MT. The battery pack BATP has a negative power supply terminal P(−) outputting a reference voltage GND, a positive power supply terminal P(+) outputting a bus voltage VCC using the reference voltage GND as a reference, and a control terminal Pcb. The motor MT is, although not limited, a brushless DC motor or the like driven by AC voltages Vu, Vv, and Vw of three phases (U phase, V phase, and W phase). When the motor MT is, for example, a brushless DC motor with a sensor, phase information (rotation position of the motor) θsen is output by using a Hall element or the like.

The motor driving unit MTDVU has a bus voltage terminal Pvc to which the bus voltage VCC from the positive power supply terminal P(+) is supplied, a reference voltage terminal Pgd to which the reference voltage GND from the negative power supply terminal P(−) is supplied, a control terminal Pcm, and motor drive terminals Pou, Pov, and Pow outputting the AC voltages Vu, Vv, and Vw, respectively. The motor driving unit MTDVU has a motor control unit MCTL, a driver unit DV, an inverter unit IVU, a current detection resistor Ri, a bus voltage line LNvc transmitting the bus voltage, and a reference voltage line LNgd transmitting the reference voltage GND.

The inverter unit IVU has high-side switches SWuh, SWvh, and SWwh provided between the motor drive terminals Pou, Pov, and Pow and the bus voltage line LNVc, respectively, and low-side switches SWul, SWvl, and SWwl provided between the motor drive terminals Pou, Pov, and Pow and the reference voltage line LNgd, respectively. Each of the high-side switches and the low-side switches is comprised of, for example, a transistor represented by an IGBT (Insulated Gate Bipolar Transistor) or an MOSFET (Metal Oxide Semiconductor Field Effect Transistor) and a freewheel diode which is coupled in parallel to the transistor.

A current detection resistor Ri is inserted in the reference voltage line LNgd and generates a voltage proportional to a motor current Imt across both ends. The motor control unit MCTL generates PWM signals PWMu, PWMv, and PWMw of three phases on the basis of the phase information θsen from the motor MT, the speed instruction signal REF from the outside, and the voltage across the current detection resistor Ri. The motor control unit MCTL is, although not limited, for example, comprised of a semiconductor device such as a micro controller chip.

The driver unit DV receives the PWM signal PWMu of the U phase and complementarily controls on/off of each of the transistors included in the high-side switch SWuh and the low-side switch SWul of the U phase. Similarly, the driver unit DV receives the PWM signal PWMv of the V phase, complementarily controls on/off of each of the transistors (SWvh and SWvl) for V phase, receives the PWM signal PWMw of the W phase, and complementarily controls on/off of each of the transistors (SWwh and SWwl) for W phase. The inverter unit IVU switches a plurality of transistors in accordance with the PWM signal from the driver unit DV to convert the bus voltage VCC to the AC voltages Vu, Vv, and Vw of the three phases and outputs the AC voltages Vu, Vv, and Vw from the motor drive terminals Pou, Pov, and Pow to drive the motor MT.

Schematic Configuration of Motor Control Unit

Figure 2:
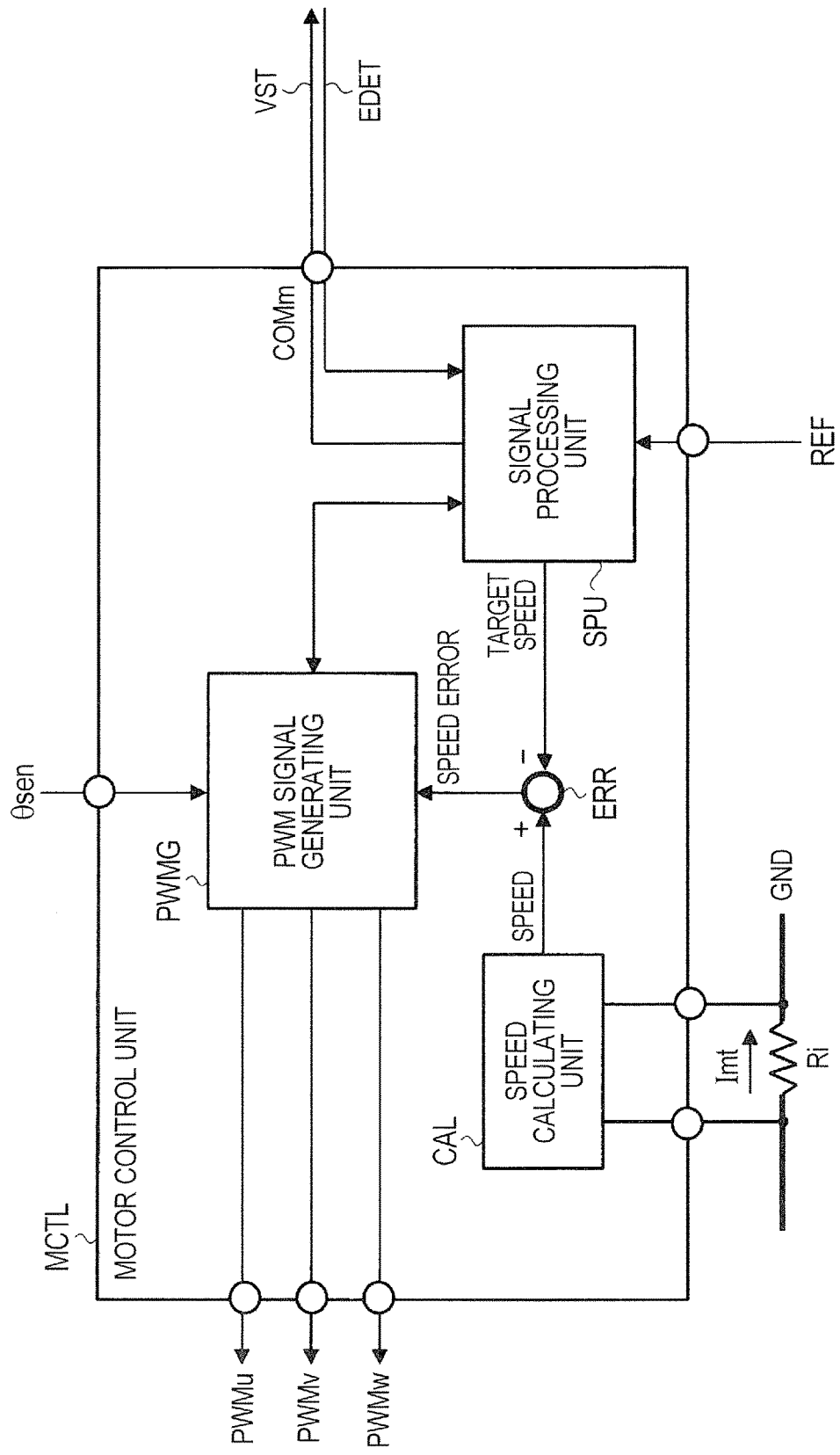
FIG. 2 is a block diagram illustrating a schematic configuration example of a motor control unit in FIG. 1.
Figure 3:
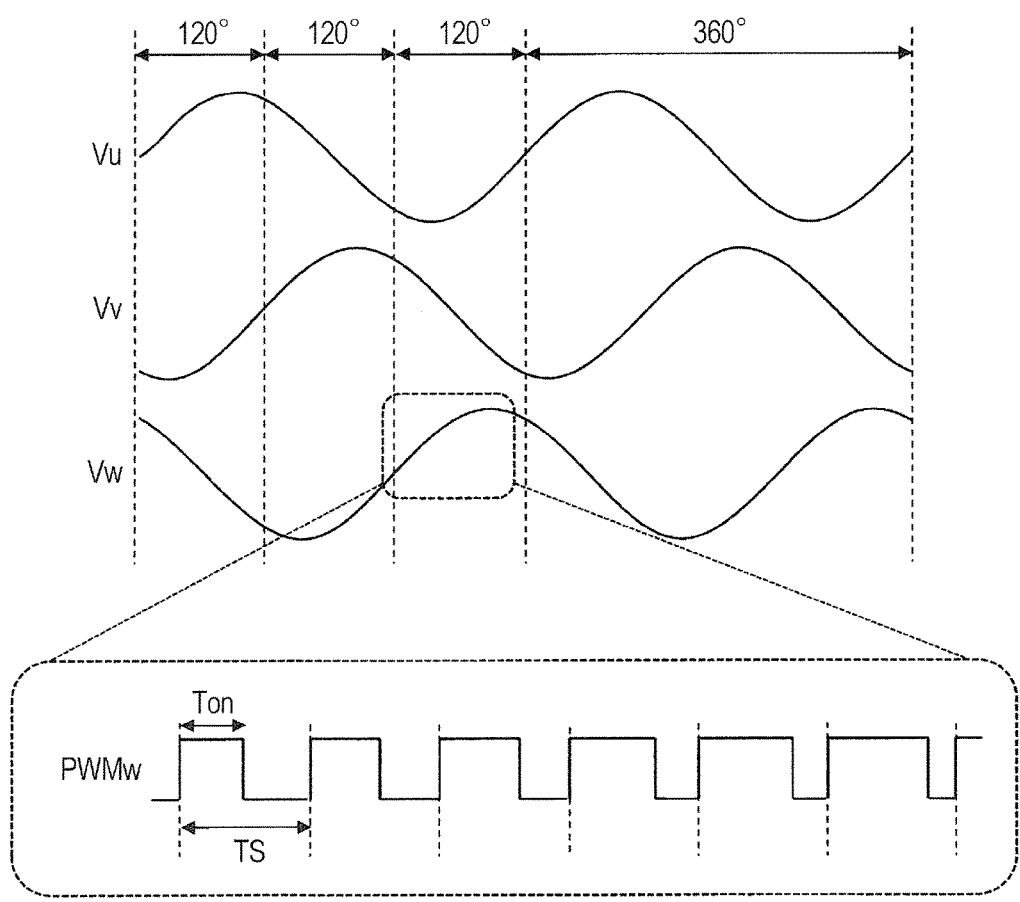
FIG. 3 is an explanatory diagram illustrating an example of the relation between a PWM signal and an AC voltage in FIG. 1.

FIG. 2 is a block diagram illustrating a schematic configuration example of the motor control unit in FIG. 1. FIG. 3 is an explanatory diagram illustrating an example of the relation between the PWM signal and the AC voltage in FIG. 1. The motor control unit MCTL in FIG. 2 has a signal processing unit SPU, a speed calculating unit CAL, an error calculating unit ERR, and a PWM signal generating unit PWMG. The speed calculating unit CAL calculates the rotational speed of the motor MT on the basis of the voltage across the current detection resistor Ri (that is, the motor current Imt). The signal processing unit SPU determines a target rotational speed on the basis of the speed instruction signal REF from the outside.

The error calculating unit ERR calculates the speed error between the rotational speed from the speed calculating unit CAL and the target rotational speed from the signal processing unit SPU. The PWM signal generating unit PWMG determines, for example, the control width of the duty on the basis of the speed error from the error calculating unit ERR and generates the PWM signals PWMu, PWMv, and PWMw of the three phases for controlling the AC voltages Vu, Vv, and Vw to sine wave.

Concretely, the AC voltages Vu, Vv, and Vw are desirably sine wave as illustrated in FIG. 3. For example, to generate the AC voltage Vw of the sine wave in the W phase, the PWM signal generating unit PWMG generates the PWM signal PWMw whose duty (=on width (Ton)/Ts) varies stage by stage within a predetermined control width every switching cycle TS. The wider the control width of the duty is, the larger the voltage amplitude of the AC voltage Vw is, and the rotational speed of the motor MT increases. The PWM signal generating unit PWMG determines the timing of outputting the PWM signal having a predetermined duty on the basis of the phase information θsen. The PWM signal generating method is not limited to the method as illustrated in FIG. 2 but may be a sine-wave driving method which is generally known or, in some cases, a rectangular-wave driving method.

The signal processing unit SPU outputs a voltage instruction signal VST via a control terminal COMm and receives an error detection signal EDET which is supplied via the control terminal COMm. As illustrated in FIG. 1, the control terminal COMm is coupled to the control terminal Pcb of the battery pack BATP via the control terminal Pcm of the motor driving unit MTDVU. As the details will be described later, the voltage instruction signal VST is a signal for instructing the bus voltage VCC, and the error detection signal EDET is a signal generated when the battery pack BATP detects abnormality such as overvoltage or overcurrent. When the error detection signal EDET is received, the signal processing unit SPU gives an instruction of, for example, stopping generation of the PWM signal to the PWM signal generating unit PWMG.

Configuration of Battery Pack (Comparative Example)

Figure 16:
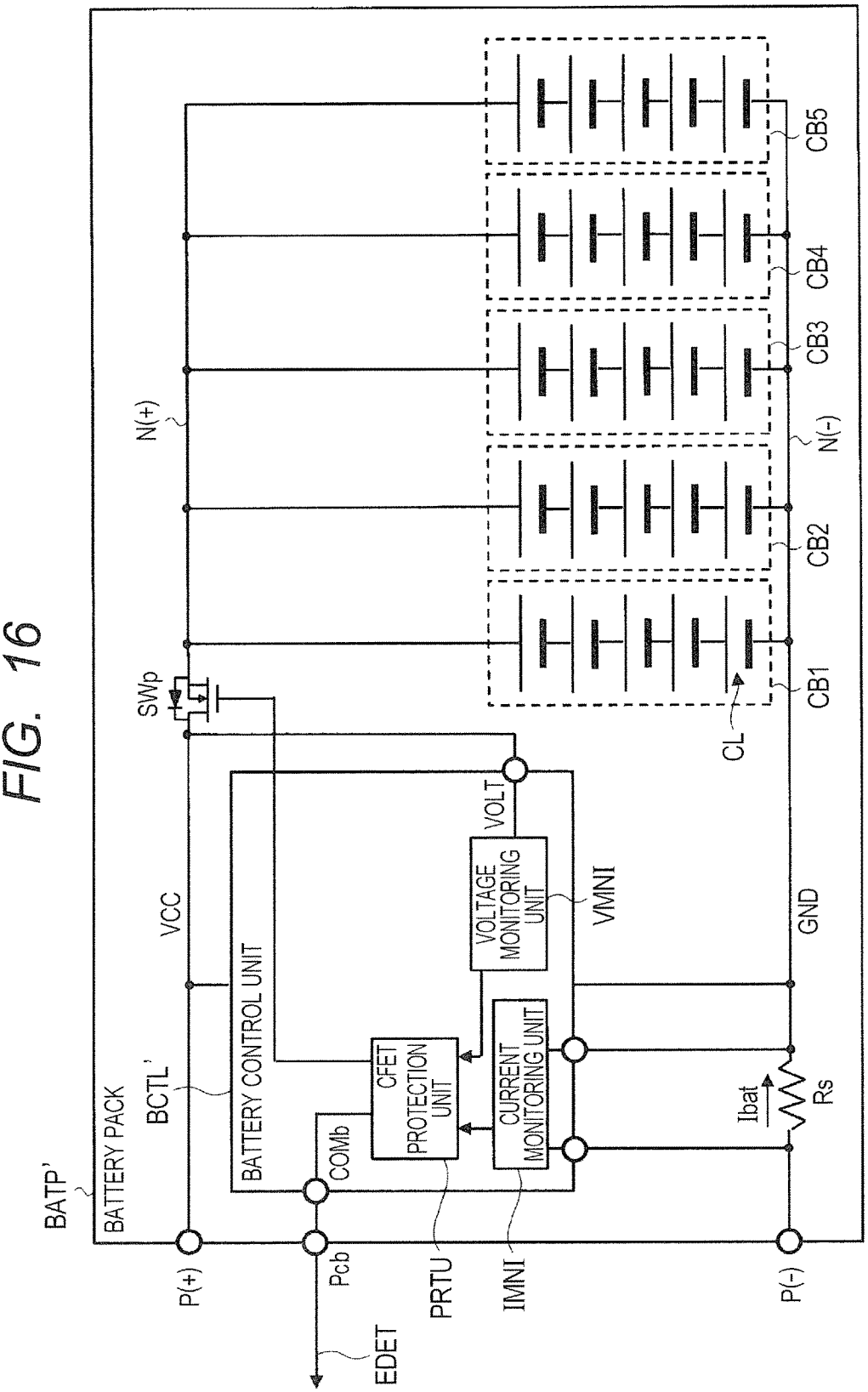
FIG. 16 is a block diagram illustrating a configuration example of a battery pack examined as a comparative example of the present invention.

FIG. 16 is a block diagram illustrating a configuration example of a battery pack examined as a comparative example of the present invention. As described with reference to FIG. 1, a battery pack BATP' illustrated in FIG. 16 has the positive power supply terminal P(+), the negative power supply terminal P(−), and the control terminal Pcb. The battery pack BATP' has a plurality of (five in this case) cell blocks CB1 to CB5, a battery control unit BCTL', a protection switch SWp, and a current detection resistor Rs.

The cell blocks CB1 to CB5 are coupled in parallel between a positive voltage node N(+) and a negative voltage node N(−). In the present specification, each of the cell blocks CB1 to CB5 is representatively called a cell block CB. The cell block CB is comprised of a single cell or a plurality of (five) cells CL which are coupled in series. The cell CL is a secondary cell and is, for example, a lithium ion battery, a nickel-metal hydride battery, or the like. For example, in the case of a lithium ion battery, one cell CL generates a voltage of about 3.7V, and the cell block CB generates a voltage of about 19V. The number of the cells CL which are coupled in series is determined according to the magnitude of the bus voltage VCC required or the like, and the number of the cell blocks CB which are coupled in parallel is determined according to the required battery capacity or the like.

The negative voltage node N(−) is coupled to the negative power supply terminal P(−), and the positive voltage node N(+) is coupled to the positive power supply terminal P(+). The current detection resistor Rs is inserted in a path between the negative voltage node N (−) and the negative power supply terminal P(−), and the protection switch SWp is inserted in a path between the positive voltage node N(+) and the positive power supply terminal P(+). The invention is not limited to the configuration. It is sufficient that each of the current detection resistor Rs and the protection switch SWp is properly inserted on the positive side or the negative side.

The battery control unit BCTL' has a voltage monitoring unit VMNI, a current monitoring unit IMNI, and a protection unit PRTU. The voltage monitoring unit VMNI monitors the bus voltage VCC. The current monitoring unit IMNI monitors a bus current (battery current) Ibat by the voltage across the current detection resistor Rs. The protection unit PRTU detects the presence/absence of abnormality in the bus voltage or bus current on the basis of a predetermined condition and controls on/off of the protection switch SWp via the control signal CFET in accordance with the presence/absence of abnormality. For example, when overcurrent is detected, the protection unit PRTU controls the protection switch SWp to be off.

When the presence of abnormality is detected, the battery control unit BCTL' outputs the error detection signal EDET via the control terminal COMb. As illustrated in FIGS. 1 and 2, the error detection signal EDET is transmitted to the control terminal Pcb of the battery pack BATP' and the motor control unit MCTL via the control terminal Pcm of the motor driving unit MTDVU. The battery control unit BCTL' may detect not only an error in the bus voltage or bus current but also an error in temperature or the like.

Problems in Motor Driving System

As illustrated in FIG. 1, in the motor driving system using the battery pack BATP, particularly, power saving is required. One of methods realizing power saving is a method of reducing a switching loss of the inverter unit IVU by lowering the switching frequency of the PWM signals PWMu, PWMv, and PWMw. However, when the switching frequency is lowered, the output precision of the AC voltages Vu, Vv, and Vw from the inverter unit IVU decreases only by the amount. Usually, the more the waveform of the AC voltage becomes different from the sine wave, the more the drive efficiency of the motor MT decreases. Consequently, in some cases, power saving cannot be sufficiently achieved by lowering the switching frequency only.

It is also considered to lower the switching frequency and also decrease the bus voltage VCC to the inverter unit IVU. Concretely, as illustrated in FIG. 16, the bus voltage VCC output from the battery pack BATP' is a fixed value. Consequently, to make the bus voltage VCC vary, for example, by using the configuration in the patent literature 4 or the like, a DC/DC converter may be inserted between the battery pack BATP' and the inverter unit IVU. However, when a DC/DC converter is provided, the circuit scale and cost increase and a power loss can occur also in the DC/DC converter. There is consequently a case that power saving cannot be achieved sufficiently.

Configuration and Operation of Battery Pack (First Embodiment)

Figure 4:
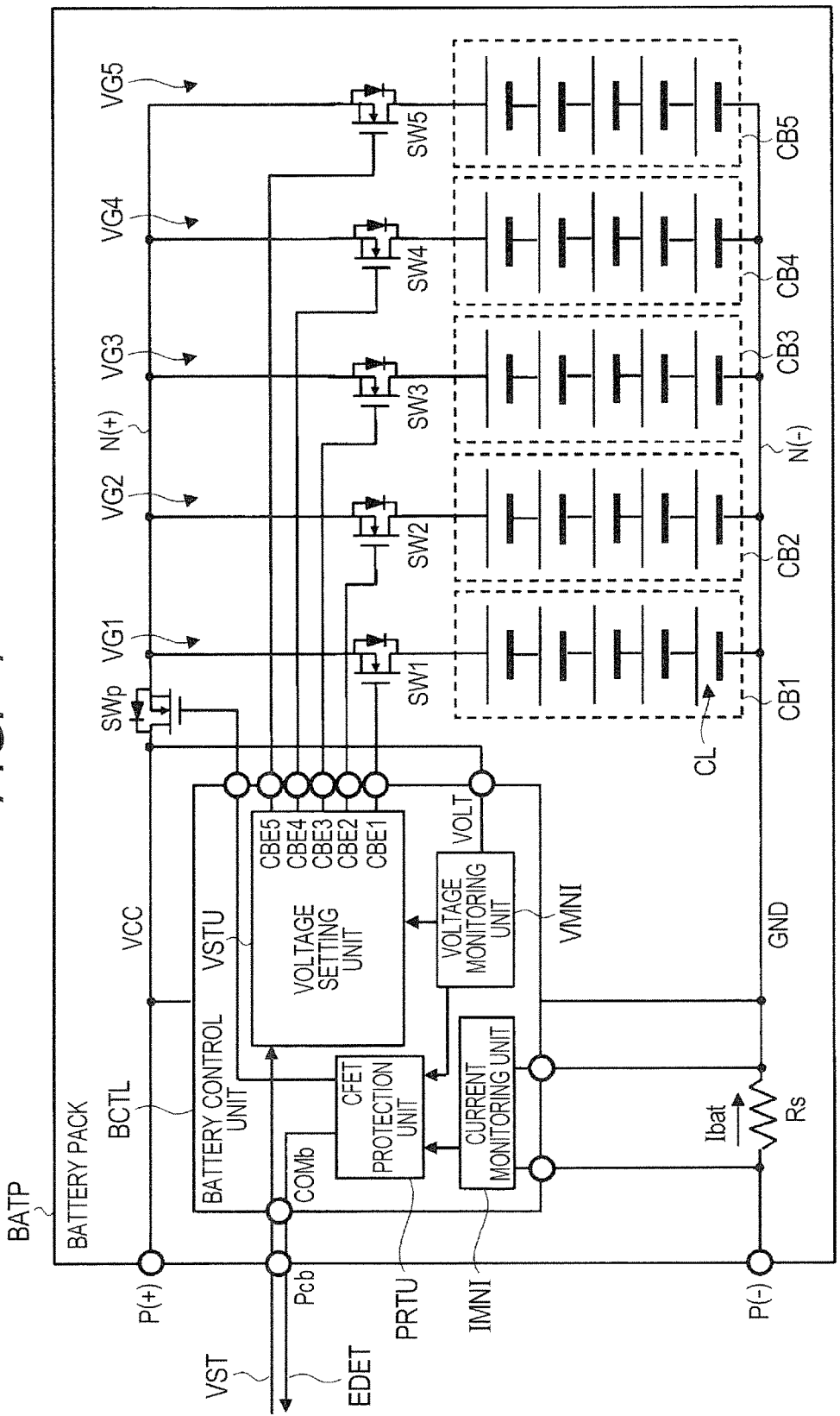
FIG. 4 is a block diagram illustrating a configuration example of a battery pack in FIG. 1.

FIG. 4 is a block diagram illustrating a configuration example of a battery pack in FIG. 1. Description will be given by paying attention to the point different from the battery pack BATP' of FIG. 16. The battery pack illustrated in FIG. 4 has a plurality of (five in this case) voltage generating units VG1 to VG5 which are coupled in parallel between the positive voltage node N(+) and the negative voltage node N(−). The voltage generating unit VG1 has the cell block CB1 illustrated in FIG. 16 and, in addition, a switch SW1 coupled in series to the cell block CB1. Similarly, the voltage generating units VG2, VG3, VG4, and VG5 have the cell blocks CB2, CB3, CB4, and CB5 illustrated in FIG. 16 and, in addition, switches SW2, SW3, SW4, and SW5 coupled in series to the cell blocks CB2, CB3, CB4, and CB5.

Different from the battery control unit BCTL' of FIG. 16, the battery control unit BCTL of FIG. 4 has a plurality of (five in this case) enable terminals (CBE1 to CBE5) coupled to the switches SW1 to SW5 and a voltage setting unit VSTU. From the enable terminals (CBE1 to CBE5), enable signals CBE1 to CBE5 controlling on/off of the switches SW1 to SW5 are output, respectively. The voltage setting unit VSTU receives the voltage instruction signal VST from the motor control unit MCTL illustrated in FIG. 2 by the control terminal COMb. The voltage setting unit VSTU controls on/off of the switches SW1 to SW5 via the enable signals (enable terminals) CBE1 to CBE5, thereby variably controlling the bus voltage VCC. In the present specification, the switches SW1 to SW5 will be representatively called switches SW.

In practice, the cell CL has an internal resistor. The battery control unit BCTL performs variable control on the bus voltage VCC by using the internal resistor. Concretely, according to the number of switches SW which are controlled to be on (in other words, the number of cell blocks CB coupled in parallel between the positive voltage node N(+) and the negative voltage node N(−), a combined resistance value as a total of the cell blocks CB1 to CB5 changes. As a result, the magnitude of a voltage drop accompanying the motor current Imt (or bus current Ibat) also changes. For example, when the motor current Imt is set to be constant, the smaller the number of switches SW which are controlled to be on is, the larger the combined resistance value and the voltage drop become (in other words, the bus voltage VCC decreases).

The battery control unit BCTL is, not always limited, comprised of a semiconductor device such as a microcontroller chip. In this case, the voltage monitoring unit VMNI may monitor the bus voltage VCC as a voltage monitor signal by a voltage monitor terminal and monitor the bus voltage VCC by converting the voltage monitor signal VOLT to a digital value by an analog/digital converter. Similarly, the current monitoring unit IMNI may monitor the voltage across the current detection resistor Rs (in practice, since the voltage at one end is the reference voltage GND, only the voltage at the other end is sufficient) by using an analog/digital converter. The protection unit PRTU and the voltage setting unit VSTU are mounted by a program process using a processor or the like.

Although the switch SW is provided on the positive voltage node N(+) side in the example of FIG. 4, it may be provided on the negative voltage node N(−) side. To reduce a loss, the switch SW is comprised of, for example, an n-channel-type MOSFET or the like. In the example of FIG. 4, the battery control unit BCTL has a circuit which boosts the bus voltage VCC to control the n-channel-type MOSFET provided on the positive voltage node N(+) side to be on.

Figure 5:
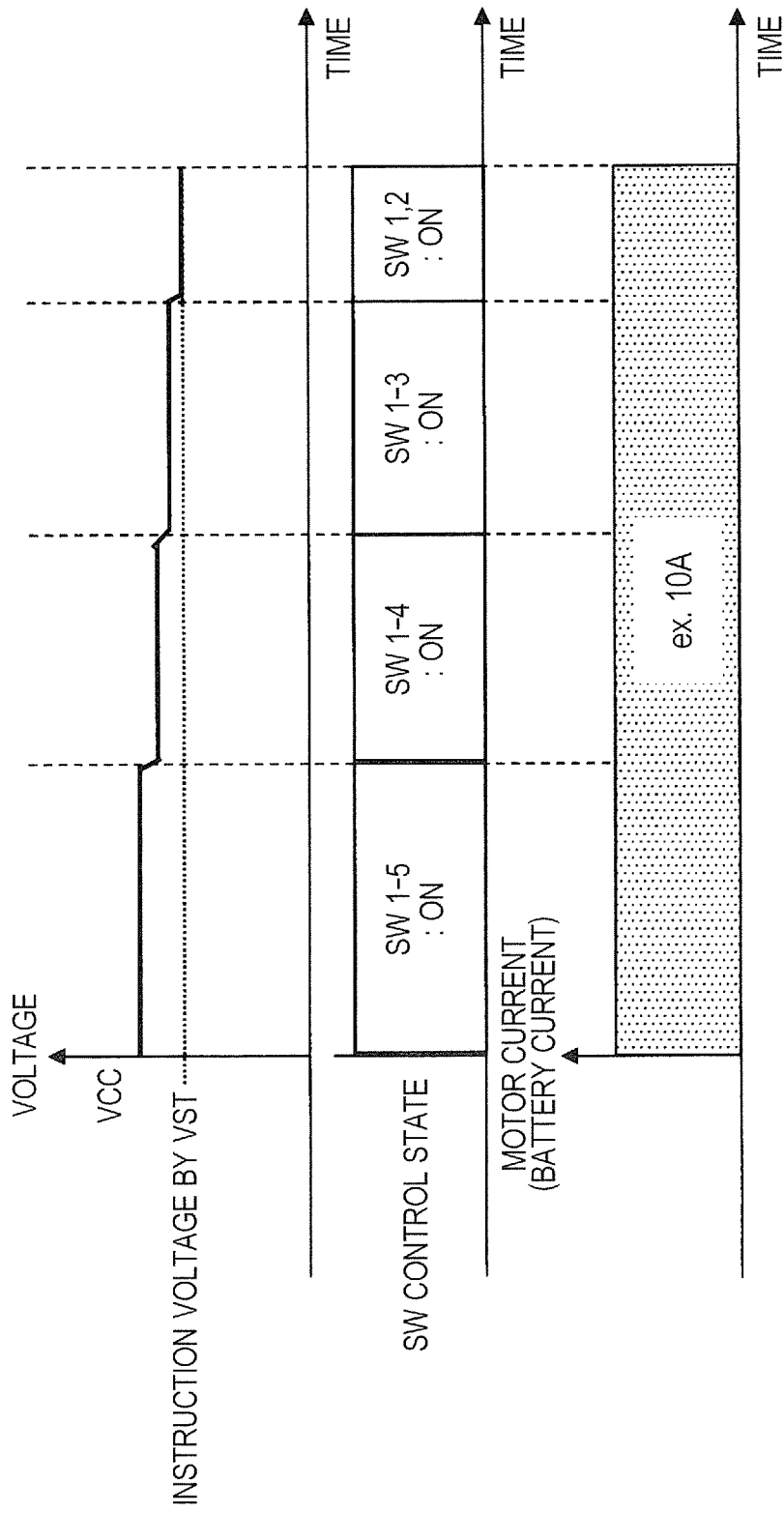
FIG. 5 is an explanatory diagram illustrating an operation example of a voltage setting unit VSTU in FIG. 4.

FIG. 5 is an explanatory diagram illustrating an operation example of the voltage setting unit VSTU in FIG. 4. As illustrated in FIG. 5, the voltage setting unit VSTU changes the number of switches SW controlled to be on one by one while monitoring the bus voltage VCC via the voltage monitoring unit VMNI until the bus voltage VCC becomes the magnitude according to the voltage instruction signal VST. In the example of FIG. 5, the voltage setting unit VSTU switches the switches SW controlled to be on in order of five switches (SW1 to SW5), four switches (SW1 to SW4), three switches (SW1 to SW3), and two switches (SW1 and SW2) until the bus voltage VCC becomes the magnitude according to the voltage instruction signal VST. Accordingly, the bus voltage VCC decreases step by step. At the stage where the number of switches SW controlled to be on is determined as two, the bus voltage VCC according to the voltage instruction signal VST is obtained.

For example, when a new voltage instruction signal VST is received in a state where the number of switches SW controlled to be on is two, according to the instruction, the voltage setting unit VSTU increases the switches SW controlled to be on in order like three, four, ... or decreases the number to one. Alternatively, as illustrated in FIG. 5, the voltage setting unit VSTU may reset to the state where all of the switches SW1 to SW5 are controlled to be on and re-perform the process of decreases the number of switches SW controlled to be on one by one.

Main Effects of First Embodiment

By using the method of the first embodiment as described above, variable control on the bus voltage VCC from the battery pack BATP becomes possible representatively. As a result, as will be described, power saving of the motor driving system and the like can be realized.

Figure 6:
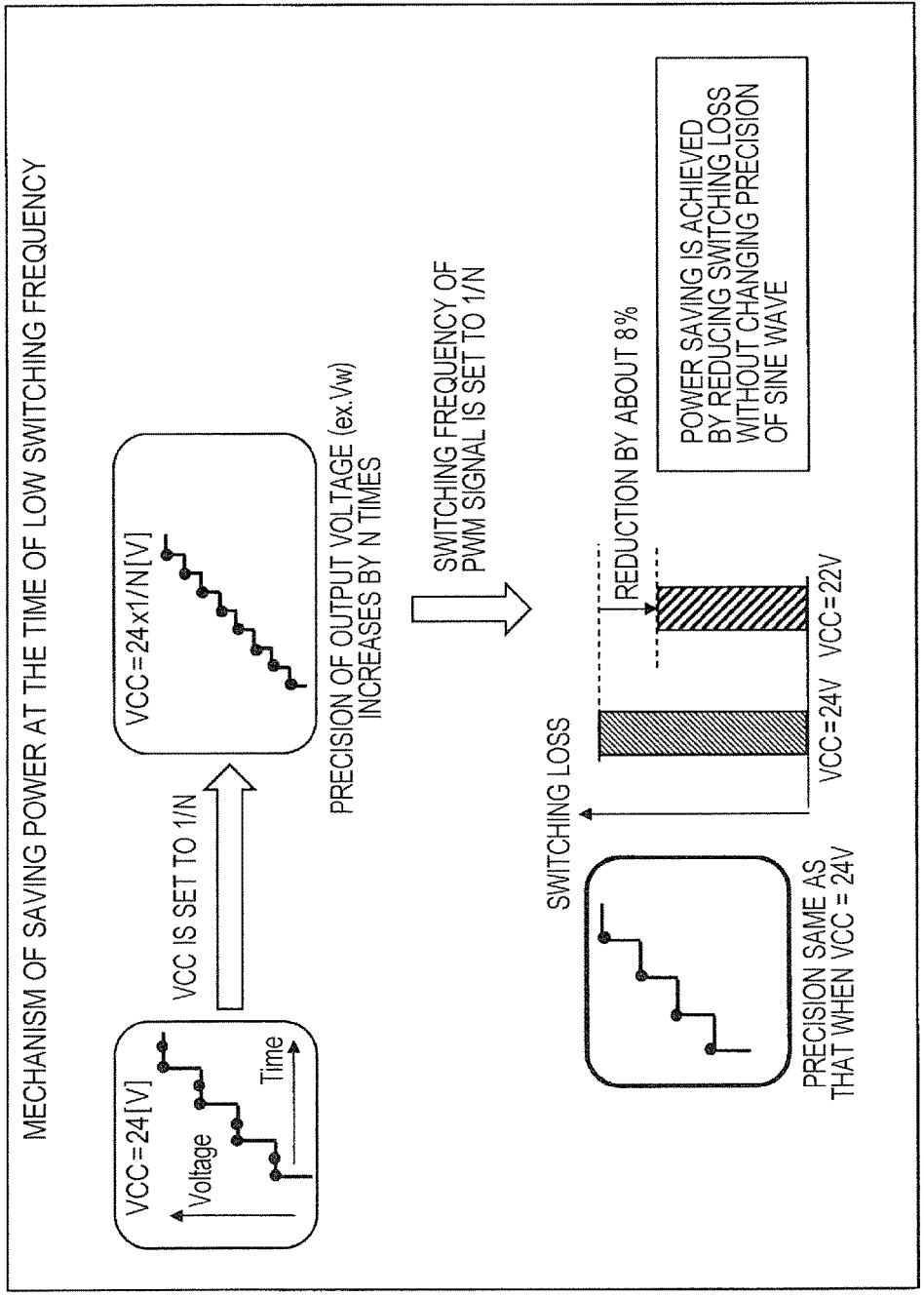
FIG. 6 is an explanatory diagram related to power saving achieved when the motor driving system in FIGS. 1 and 4 is used.

Each of FIGS. 6, 7, and 8 is an explanatory diagram related to power saving achieved when the motor driving system in FIGS. 1 and 4 is used. FIG. 6 illustrates the mechanism of power saving achieved by lowering the switching frequency of the inverter unit IVU. In FIG. 6, for example, in the case of setting the bus voltage VCC to 1/N from the state where the bus voltage VCC=24V, the output precision of the AC voltages Vu, Vv, and Vw can be increased by N times. Specifically, when the voltage range corresponding to the control width of the duty of the PWM signal becomes 1/N, the change amount of voltage to the change amount of the duty becomes 1/N, and the output precision (resolution in the voltage direction) improves by N times.

On the other hand, when the switching frequency of the PWM signal is set to 1/N (that is, the switching cycle TS in FIG. 3 is set by N times) from the state where the bus voltage VCC is set to 1/N, the output precision (resolution in the time axis direction) of the AC voltages Vu, Vv, and Vw decreases by 1/N. Since the output precision which was improved by N times decreases by 1/N, the AC voltages Vu, Vv, and Vw of sine wave can be generated with output precision equivalent to that in the state where the bus voltage VCC=24V. Moreover, by setting the switching frequency to 1/N, power saving can be achieved. For example, by decreasing the bus voltage VCC from 24V by about 8% (that is, to about 22V) and, accordingly, lowering the switching frequency of the PWM signal by about 8%, an effect of reducing the switching loss of about 8% can be expected.

As operations in practice in FIG. 2, the signal processing unit SPU monitors, for example, the control width of the duty used by the PWM signal generating unit PWMG and, when the control width is narrower than a predetermined value, can issue an instruction of decreasing the bus voltage VCC by the voltage instruction signal VST. According to circumstances, when the rotational speed based on the speed instruction signal REF, the signal processing unit SPU can issue an instruction of degreasing the bus voltage VCC by the voltage instruction signal VST. The signal processing unit SPU can instruct the PWM signal generating unit PWMG so as to lower the switching frequency of the PWM signals PWMu, PWMv, and PWMw on the basis of the decrease width of the bus voltage VCC.

FIG. 7 illustrates the mechanism of power saving achieved by increasing the output precision of the AC voltages Vu, Vv, and Vw. In FIG. 7, for example, the case of setting the switching frequency N times from the state where the bus voltage VCC=22V and the switching frequency of the PWM signal is 1/N is assumed. In this case, the output precision (resolution in the voltage direction) of the AC voltages Vu, Vv, and Vw can be increased by N times as compared with the case where the switching frequency is 1/N.

As a result, the AC voltages Vu, Vv, and Vw can have waves closer to the sine wave, so that driving efficiency of the motor MT improves and increase in power consumption accompanying noise (that is, difference from the sine wave) can be suppressed. That is, an effect of reducing the switching loss as in the case of FIG. 6 cannot be obtained but, instead, power saving can be achieved by improvement in the output precision. For example, when the switching frequency of the PWM signals PWMu, PWMv, and PWMw is increased from 18 kHz to 20 kHz, there is a case that increase in power consumption accompanying noise can be suppressed by about 10%.

Figure 8B:
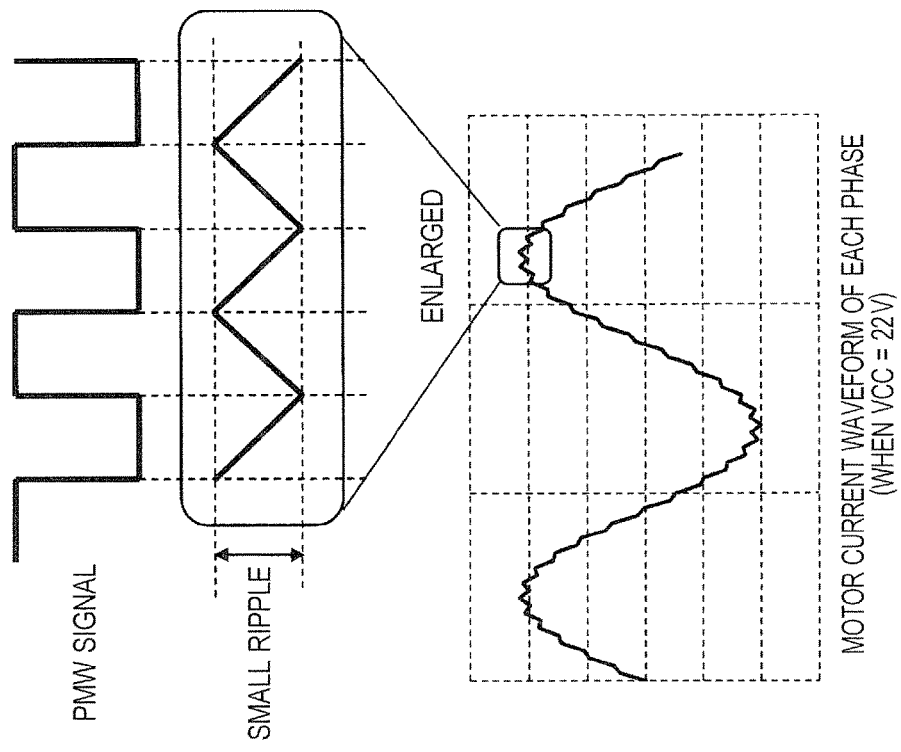
FIGS. 8A and 8B are explanatory diagrams related to power saving achieved when the motor driving system of FIGS. 1 and 4 is used.
Figure 8A:
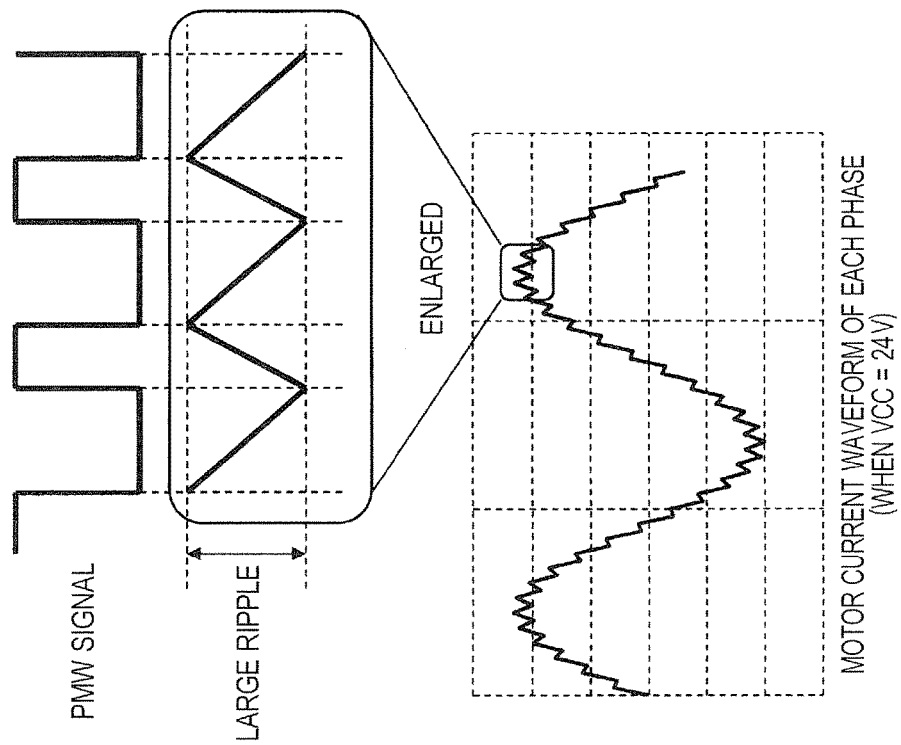

FIGS. 8A and 8B illustrate an example of the waveform of current flowing in each of the phases of the motor MT in the case where the bus voltage VCC is 24V and 22V, respectively. In a period the maximum current in the current waveform of FIG. 8A flows, the PWM signal generating unit PWMG in FIG. 2 drives the motor MT by using the maximum duty (for example, 40% or the like) in a certain control amplitude. In this period, a ripple current occurs at a tilt according to the inductance value of the motor MT and the bus voltage VCC.

On the other hand, during the period in which the maximum current in the current waveform in FIG. 8B flows, as the bus voltage VCC decreases, the PWM signal generating unit PWMG drives the motor MT by using the maximum duty (for example, 50% or the like) in a control width wider than that in the case of FIG. 8A. In this period, the ripple current is generated at a tilt smaller than that in the case of FIG. 8A in accordance with the inductance value of the motor MT and the bus voltage VCC lower than that in the case of FIG. 8A. As a result, in the case of FIG. 8B, as compared with the case of FIG. 8A, in some cases, the current ripple can be reduced, the driving efficiency of the motor MT improves, and power saving is achieved.

By providing the mechanism capable of variable-controlling the bus voltage VCC from the battery pack BATP as described above, power saving can be realized. On the other hand, as a comparative example of the method of FIG. 4, there is also a method of inserting a DC/DC converter between the battery pack BATP and the inverter unit IVU. However, when a DC/DC converter is provided, the circuit scale and the part cost increase and, further, a power loss may occur also in the DC/DC converter. Consequently, there is a case that power saving cannot be sufficiently achieved. It is therefore beneficial to use the method of FIG. 4.

FIG. 4 illustrates a configuration example that all of the voltage generating units VG1 to VG5 coupled in parallel have the switches SW. However, all of the voltage generating units VG1 to VG5 do not have to have the switches SW. It is sufficient that at least one of the voltage generating units VG1 to VG5 has the switch SW. Also in this case, in principle, an effect as described above can be obtained. However, when the cell balance which will be described later is considered, all of the voltage generating units VG1 to VG5 have the switches.

Although a secondary cell is used as the cell CL in FIG. 4, the invention is not limited to the configuration. Depending on circumstances, a similar effect can be obtained by using a primary cell. Although the signal processing unit SPU outputs the voltage instruction signal VST in FIG. 2, in addition, it may output a current instruction signal. In this case, the battery control unit BCTL in FIG. 4 receives the current instruction signal and determines the minimum number of switches SW which are controlled to be on. By the operation, the battery control unit BCTL assures the minimum current required by the motor MT.

Second Embodiment

Configuration and Operation of Battery Pack (Application Example)

As described in the first embodiment, the battery pack BATP in FIG. 4 variably controls the bus voltage VCC by controlling the number of cell blocks CB coupled in parallel between the positive voltage node N(+) and the negative voltage node N(−). There is consequently a fear that the battery remaining amounts of the cell blocks CB1 to CB5 become non-uniform (that is, the cell balance is lost). It is known that, particularly, when the cell balance is lost in a secondary cell, the power supply capability of the battery decreases. It is consequently beneficial to use the method of the second embodiment which will be described later.

Figure 9:
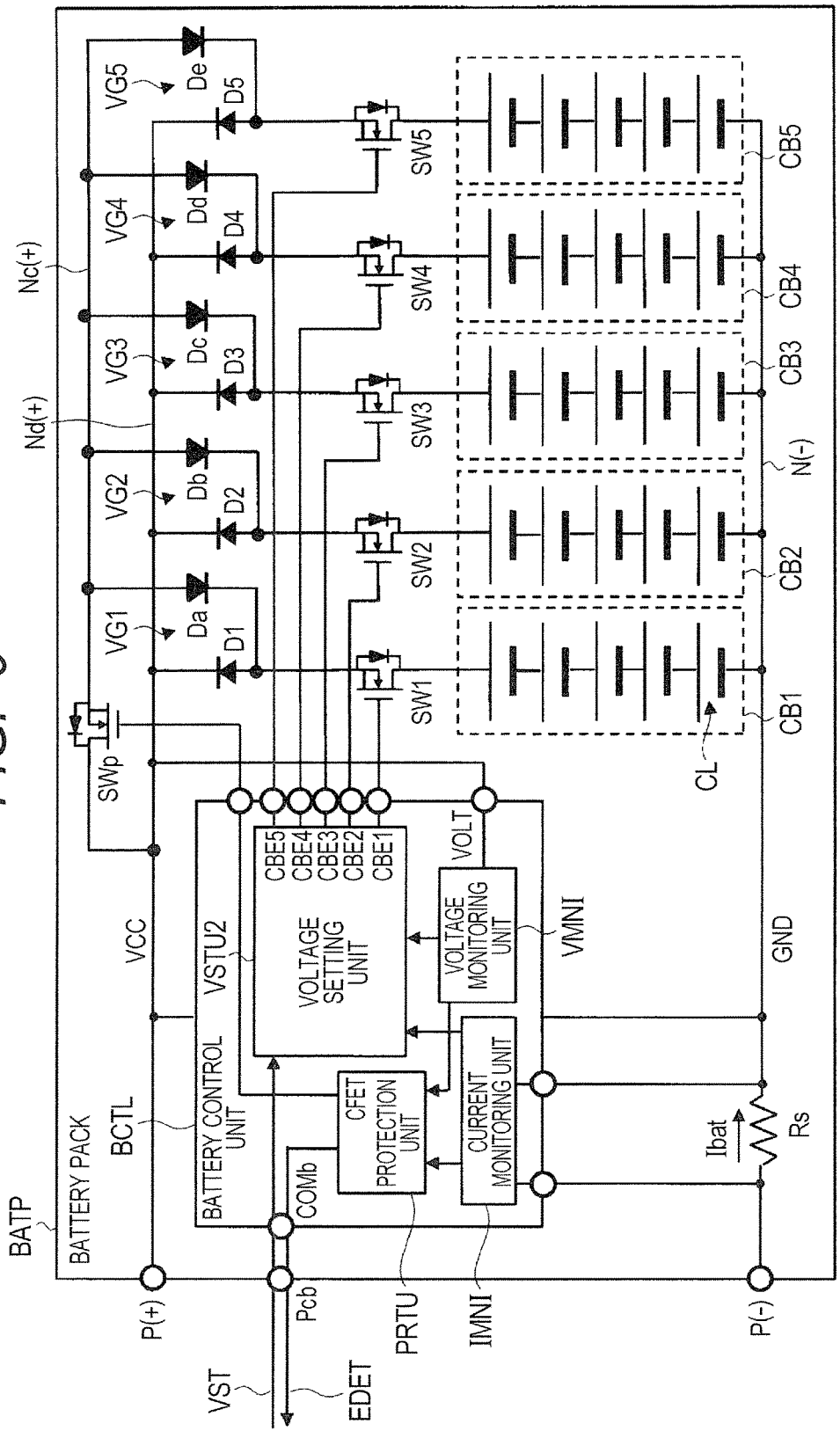
FIG. 9 is a block diagram illustrating a configuration example of a battery pack in a motor driving system according to a second embodiment of the present invention.

FIG. 9 is a block diagram illustrating a configuration example of a battery pack in a motor driving system according to the second embodiment of the present invention. The battery pack BATP illustrated in FIG. 9 is different from that in the configuration example of FIG. 4 with respect to a point that the positive voltage node N(+) is divided into a positive voltage node Nd(+) for discharging and a positive voltage node Nc(+) for charging, a point that diodes D1 to D5 and diodes Da to De are newly provided according to the division, and a point that a voltage setting unit VSTU2 different from that of FIG. 4 is provided. In this example, the protection switch SWp is inserted on a path between the positive voltage node Nc(+) for charging and the positive power supply terminal P(+). On the other hand, the positive voltage node Nd(+) for discharging is coupled directly to the positive power supply terminal P(+).

The diodes D1 to D5 are provided for a plurality of (five in this case) voltage generating units VG1 to VG5, respectively, and the diodes Da to De are also provided for a plurality of (five in this case) voltage generating units VG1 to VG5, respectively. The cathode of each of the diodes D1 to D5 (for example, D1) is coupled to the positive voltage node Nd(+) for discharging and the anode of the diode is coupled to the negative voltage node N(−) via a series coupling circuit of a switch (SW1) and a cell block (CB1). On the other hand, the anode of each of the diodes Da to De (for example, Da) is coupled to the positive voltage node Nc(+) for charging and the cathode of the diode is coupled to the negative voltage node N(−) via the series coupling circuit of the switch (SW1) and the cell block (CB1).

Figure 10:
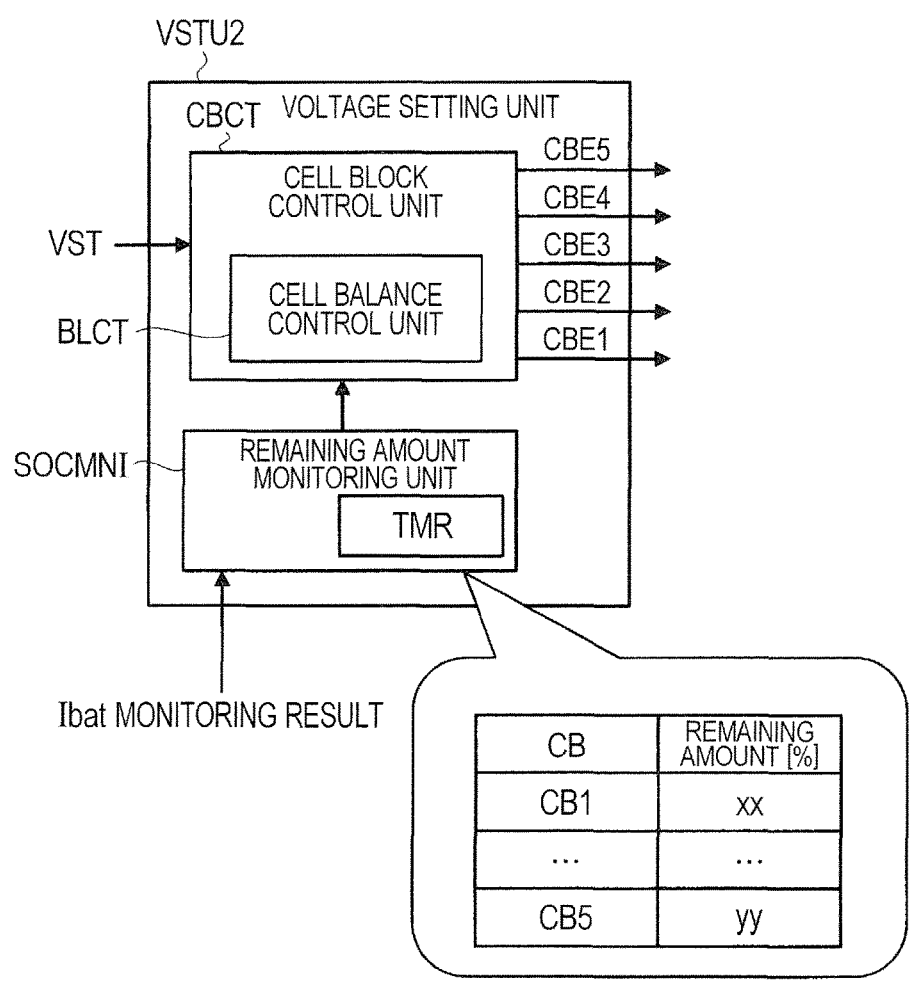
FIG. 10 is a block diagram illustrating a configuration example of a voltage setting unit in FIG. 9.

FIG. 10 is a block diagram illustrating a configuration example of the voltage setting unit in FIG. 9. A voltage setting unit VSTU2 illustrated in FIG. 10 has a cell block control unit CBCT and a remaining amount monitoring unit SOCMNI. As in the description of the voltage setting unit VSTU of FIG. 4, the cell block control unit CBCT variably controls the bus voltage VCC by controlling on/off of each of the switches SW1 to SW5 via the enable signals (enable terminals) CBE1 to CBE5 on the basis of the voltage instruction signal VST. In addition, in FIG. 9, the cell block control unit CBCT has a cell balance control unit BLCT.

The remaining amount monitoring unit SOCMNI monitors the battery remaining amount of each of the cell blocks CB1 to CB5. Concretely, the remaining amount monitoring unit SOCMNI has, for example, a timer TMR measuring on time of each of the switches SW1 to SW5 and monitors the battery remaining amount by a monitor result of the battery current Ibat by the current monitoring unit IMNI and the measurement result of the timer TMR. As an example, when n pieces (n=2 in this case) of the switches SW1 and SW2 are controlled to be on for time Ton, the battery remaining amount of each of the cell blocks CB1 and CB2 is consumed only by "(Ibat/n)×Ton [Ah]". The remaining amount monitoring unit SOCMNI sequentially stores the monitor result obtained as described above (that is, the battery remaining amount of each of the cell blocks CB1 to CB5) into a RAM or the like.

Figure 11A:
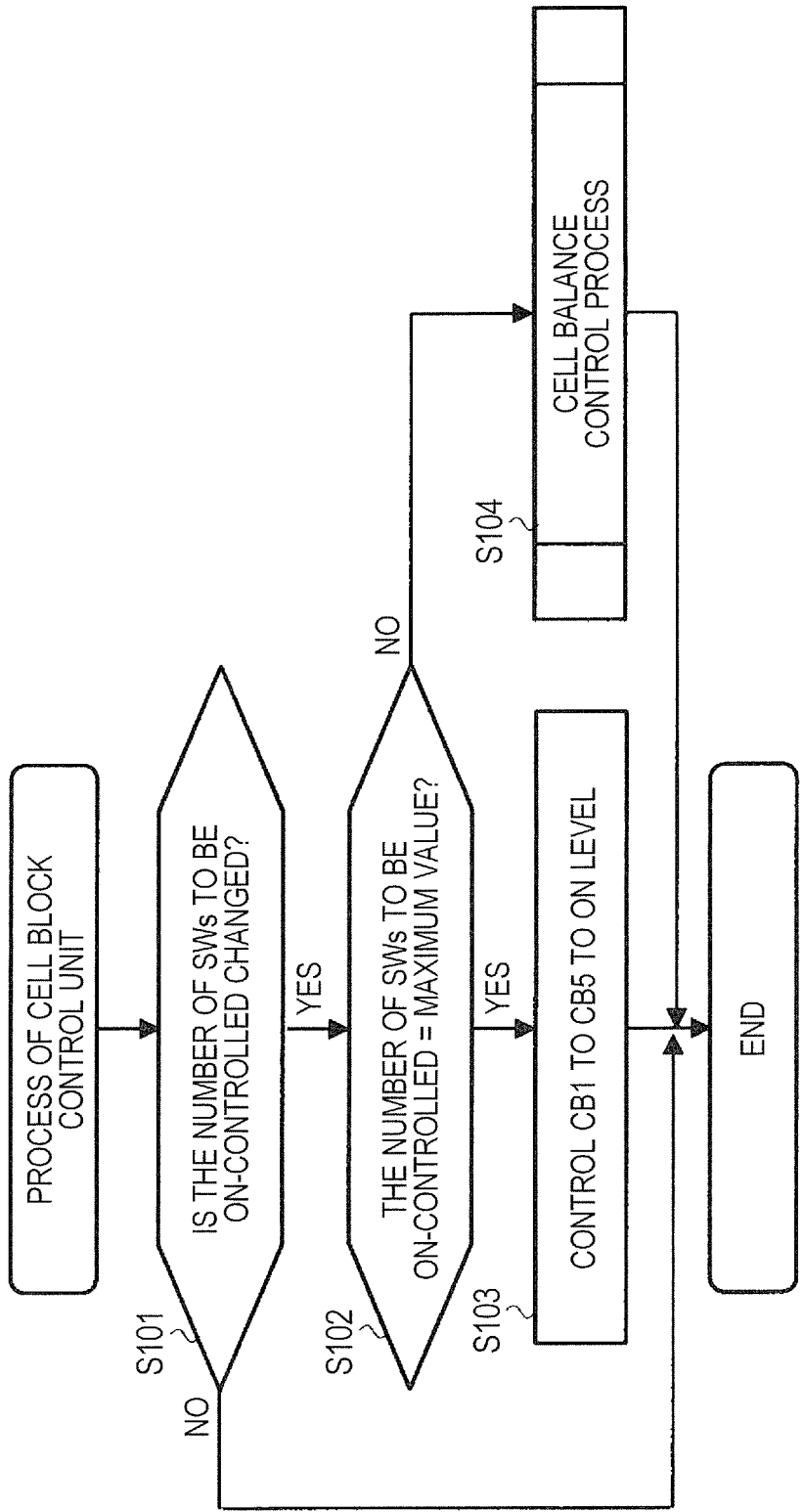
FIGS. 11A and 11B are flowcharts illustrating an example of processes related to cell balance of a cell block control unit in FIG. 10.
Figure 11B:
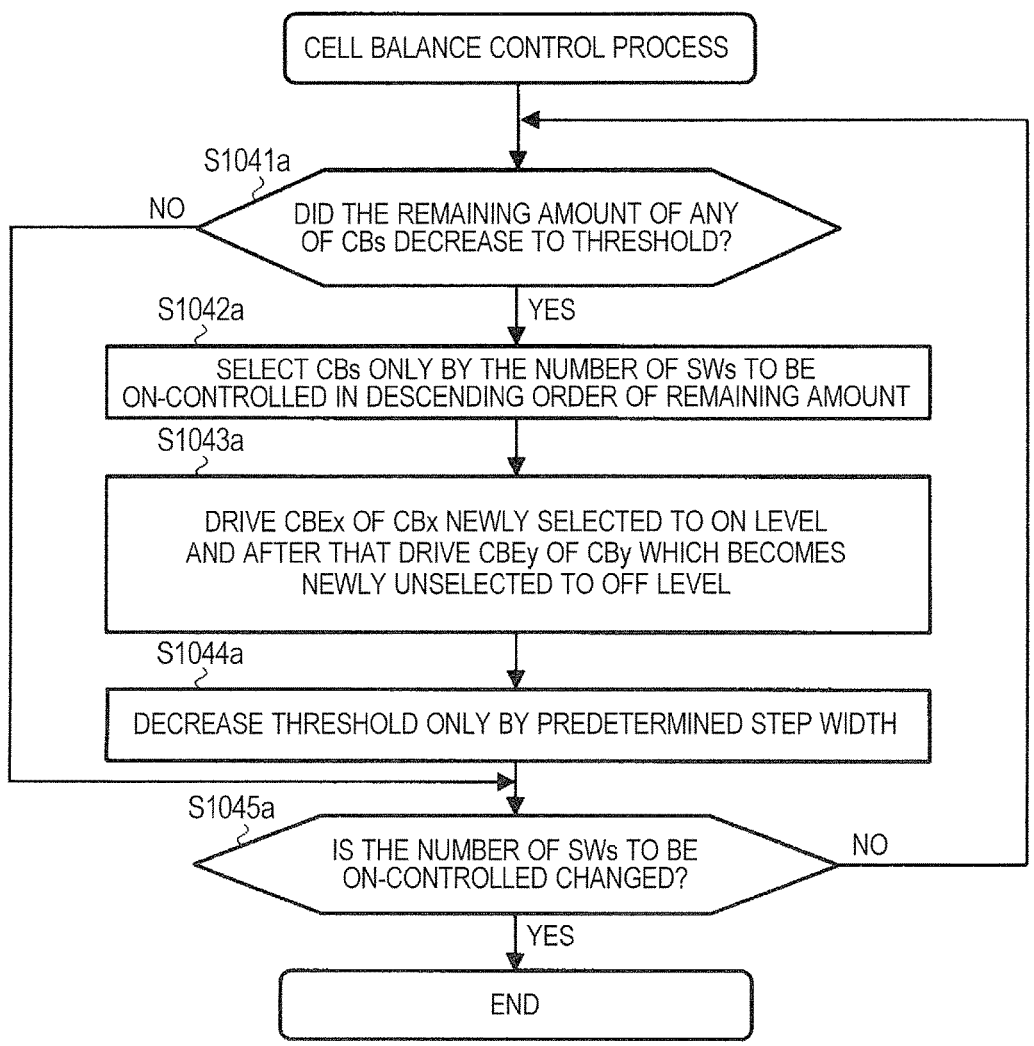

The cell balance control unit BLCT refers to the monitor result of the remaining amount monitoring unit SOCMNI, controls the switch SW corresponding to the cell block CB whose battery remaining amount is large from off to on at a predetermined timing and, after that, controls the switch SW corresponding to the cell block CB whose battery remaining amount is small from on to off, thereby equalizing the battery remaining amounts. FIGS. 11A and 11B are flowcharts illustrating an example of processes related to cell balance of the cell block control unit in FIG. 10.

In FIG. 11A, the cell block control unit CBCT determines whether the number of switches SW which are controlled to be on in response to the voltage instruction signal VST was changed or not (step S101). When the change occurred, the cell block control unit CBCT determines whether the number of switches SW controlled to be on is the maximum value (five in this case) or not (step S102). In the case of the maximum value, the cell block control unit CBCT controls the enable signals CBE1 to CBE5 to the on level (step S103). On the other hand, when the number is not the maximum value, the cell block control unit CBCT executes the cell balance control process illustrated in FIG. 11B (step S104).

In FIG. 11B, the cell balance control unit BLCT refers to the monitor result of the remaining amount monitoring unit SOCMNI and determines whether the battery remaining amount of any of the cell blocks CB1 to CB5 decreases to a threshold or not (step S1041a). When the battery remaining amount has not decreased to the threshold, the cell balance control unit BLCT repeats the process of step S1041a as long as the number of switches SW which are controlled to be on is not changed (steps S1041a and S1045a). On the other hand, when the battery remaining amount has decreased to the threshold, the cell balance control unit BLCT selects the cell blocks CB only the number of the switches SW which are controlled to be on in descending order of the remaining amounts (step S1042a).

As a result, the cell balance control unit BLCT controls the enable signal (CBEx) of the newly selected cell block (CBx) to the on level and, after that, controls the enable signal (CBEy) of the cell block (CBy) which becomes newly unselected to the off level (step S1043a). That is, without changing the number of switches SW which are controlled to be on, the positions are replaced. At this time, the switch SW newly selected is controlled is controlled to be on in an overlapping manner in order to prevent instantaneous interruption of a battery output.

After that, the cell balance control unit BLCT decreases the threshold only by a predetermined step width (step S1045a). When there is no change in the number of switches SW which are controlled to be on, the cell balance control unit BLCT performs the process of step S1041a with the newly determined threshold. That is, while decreasing the threshold step by step, the cell balance control unit BLCT executes the process of equalizing the battery remaining amounts using the threshold as a rough indication. When the number of switches SW which are controlled to be on is changed, the cell balance control unit BLCT finishes the process (step S1045a) and, in FIG. 11A, the process of the cell block control unit CBCT is performed (step S101).

To monitor the battery remaining amounts with high precision by the remaining amount monitoring unit SOCMNI, it is necessary to prevent occurrence of charging/discharging in the cell blocks CB1 to CB5. Specifically, for example, when the voltage of the cell block CB1 is higher than that of the cell block CB2, there is the possibility that current flows from the cell block CB1 toward the cell block CB2. When such current is generated, it becomes difficult for the remaining amount monitoring unit SOCMNI to grasp the battery remaining amount with high precision.

The battery pack BATP in FIG. 9, therefore, has the diodes D1 to D5. By providing the diodes D1 to D5, the positive voltage node Nd(+) becomes a node for discharging and does not become anode for charging. Consequently, charging/discharging in the cell blocks CB1 to CB5 can be prevented. In the case of providing the diodes D1 to D5, however, an operation of charging the cell blocks CB1 to CB5 from a charger may become difficult. The battery pack BATP in FIG. 9 is therefore also provided with the diodes Da to De. By providing the diodes Da to De, the positive voltage node Nc (+) becomes anode for charging and does not become a node for discharging. With the configuration, while preventing charging/discharging among the cell blocks CB1 to CB5, the operation of charging the cell blocks CB1 to CB5 from a charger can be also performed.

Figure 17:
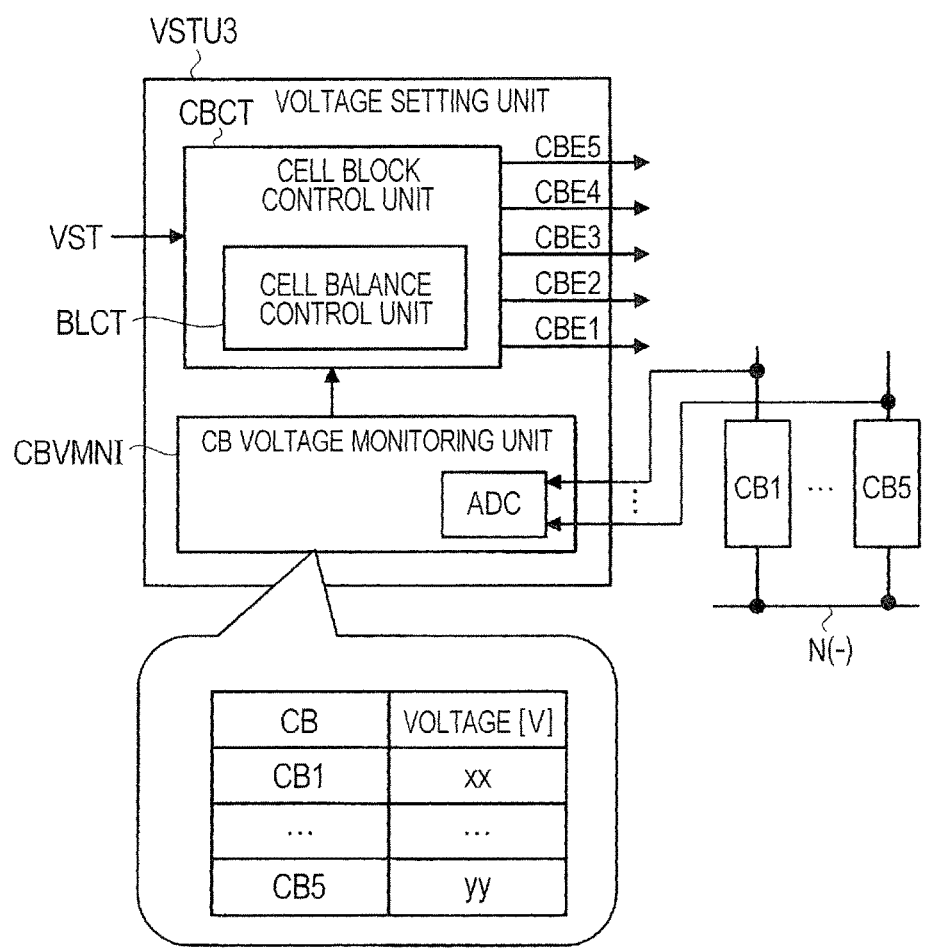
FIG. 17 is a block diagram illustrating a configuration example different from FIG. 10 of the voltage setting unit in FIG. 9.

FIG. 17 is a block diagram illustrating a configuration example different from FIG. 10 of the voltage setting unit in FIG. 9. A voltage setting unit VSTU3 illustrated in FIG. 17 is different from that in FIG. 10 with respect to the point that a CB voltage monitoring unit CBVMNI is provided in place of the remaining amount monitoring unit SOCMNI. The CB voltage monitoring unit CBVMNI has, for example, an analog/digital converter ADC adapted to a plurality of channels and monitors the battery voltage of each of the cell blocks CB1 to CB5.

Figure 18:
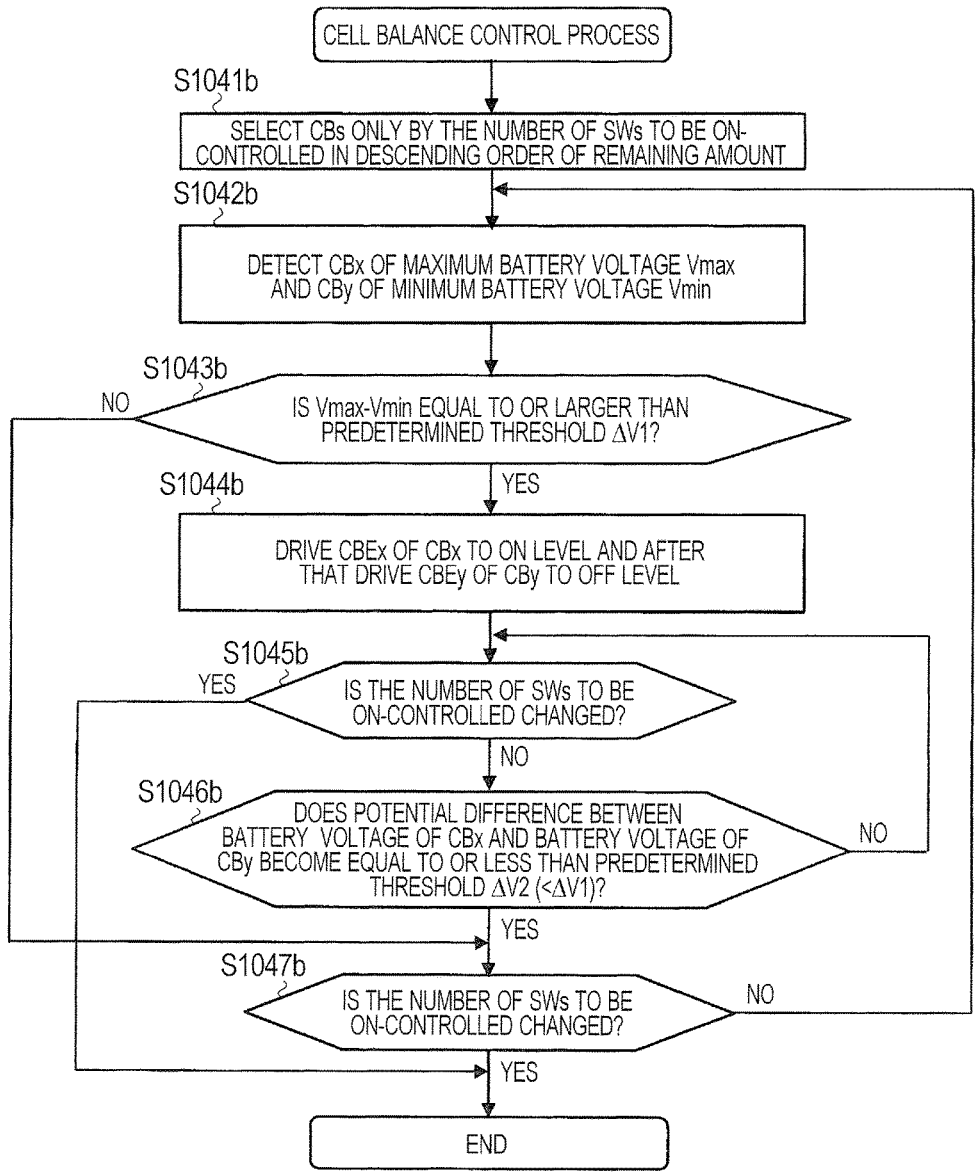
FIG. 18 is a flowchart illustrating an example of processes of a main part related to cell balance of a cell block control unit in FIG. 17.

FIG. 18 is a flowchart illustrating an example of processes of a main part related to cell balance of a cell block control unit in FIG. 17. The cell block control unit CBCT in FIG. 17 executes the processes in FIG. 11A. However, in step S104 in FIG. 11A, the cell balance control unit BLCT in FIG. 17 executes the processes in FIG. 18, not the processes of FIG. 11B.

In FIG. 18, the cell balance control unit BLCT refers to the monitor result of the CB voltage monitoring unit CBVMNI and selects the cell blocks CB only by the number of the switches SW which are controlled to be on in descending order of the battery voltages (step S1041b). Subsequently, the cell balance control unit BLCT detects the cell block (CBx) having the maximum battery voltage Vmax in the unselected cell blocks CB and the cell block (CBy) having the minimum battery voltage Vmin in the cell blocks CB being selected (step S1042b).

Subsequently, the cell balance control unit BLCT determines whether "Vmax−Vmin" is equal to or larger than a predetermined threshold ΔV1 (for example, 100 mV) (step S1043b). When "Vmax−Vmin" is equal to or larger than the threshold ΔV1, the cell balance control unit BLCT controls the enable signal (CBEx) of the cell block (CBx) to the on level and, after that, controls the enable signal (CBEy) of the cell block (CBy) to the off level (step S1044b).

As long as there is no change in the number of switches SW which are controlled to be on (step S1045b), the cell balance control unit BLCT maintains the present state until the potential difference between the battery voltage of the cell block (CBx) and the battery voltage of the cell block (CBy) becomes equal to or less than a predetermined threshold ΔV2 (ΔV2 is smaller than ΔV1 and is, for example, 50 mV) (step S1046b). On the other hand, when the potential difference becomes equal to or less than the threshold ΔV2, the cell balance control unit BLCT determines whether the number of switches SW which are controlled to be on is changed or not (step S1047b), when there is no change, returns to step S1042b, and retrieves a cell block CB which newly becomes an object of cell balance.

When "Vmax−Vmin" is less than the threshold ΔV1 in step S1043b, as long as the number of switches SW which are controlled to be on is unchanged (step S1047b), the cell balance control unit BLCT returns to the process in step S1042b and continues monitoring Vmax and Vmin. When the number of switches SW which are controlled to be on is changed in step S1045b or S1047b, the cell balance control unit BLCT finishes the process and, in FIG. 11A, the process of the cell block control unit CBCT is performed (step S101).

Although the cell balance control unit BLCT performs the cell balance control based on the battery remaining amount of each of the cell blocks CB in FIG. 11B, the cell balance control unit BLCT performs cell balance control on the basis of the battery voltage of each of the cell blocks CB in FIG. 18. By leveling the battery voltages of the cell blocks CB, for example, at the time of variable-controlling the bus voltage VCC from the battery pack BATP by the method of the first embodiment, the voltage setting precision can be improved. The configuration of FIG. 17 (the flow of FIG. 18) can be also combined with the configuration of FIG. 10 (the flow of FIG. 11B).

By using the method of the second embodiment, in addition to the various effects described in the first embodiment, cell balance can be maintained, decrease in power supply capability of the battery pack BATP can be suppressed, or the voltage setting precision can be improved. The processes of the cell balance control unit BLCT are not limited to those in FIG. 11B and FIG. 18 but it is sufficient to perform processes by using various levelling algorithms. As described in the first embodiment, the battery control unit BCTL is comprised of a semiconductor device such as a microcontroller chip. In this case, the cell block control unit CBCT in FIGS. 10 and 17, the remaining amount monitoring unit SOCMNI in FIG. 10, and the CB voltage monitoring unit CBVMNI in FIG. 17 can be easily mounted mainly by a program process using a processor.

Third Embodiment

Configuration and Operation of Battery Pack (Modification)

In the first embodiment, as illustrated in FIG. 5, the voltage setting unit VSTU performs a process of determining the bus voltage VCC to a value according to the voltage instruction signal VST by changing the number of switches SW which are controlled to be on one by one while monitoring the bus voltage VCC. However, when the number of switches SW is changed one by one as described above, there is the possibility that time required to determine the bus voltage VCC becomes long. It is consequently beneficial to use a method of a third embodiment which will be described.

Figure 12:
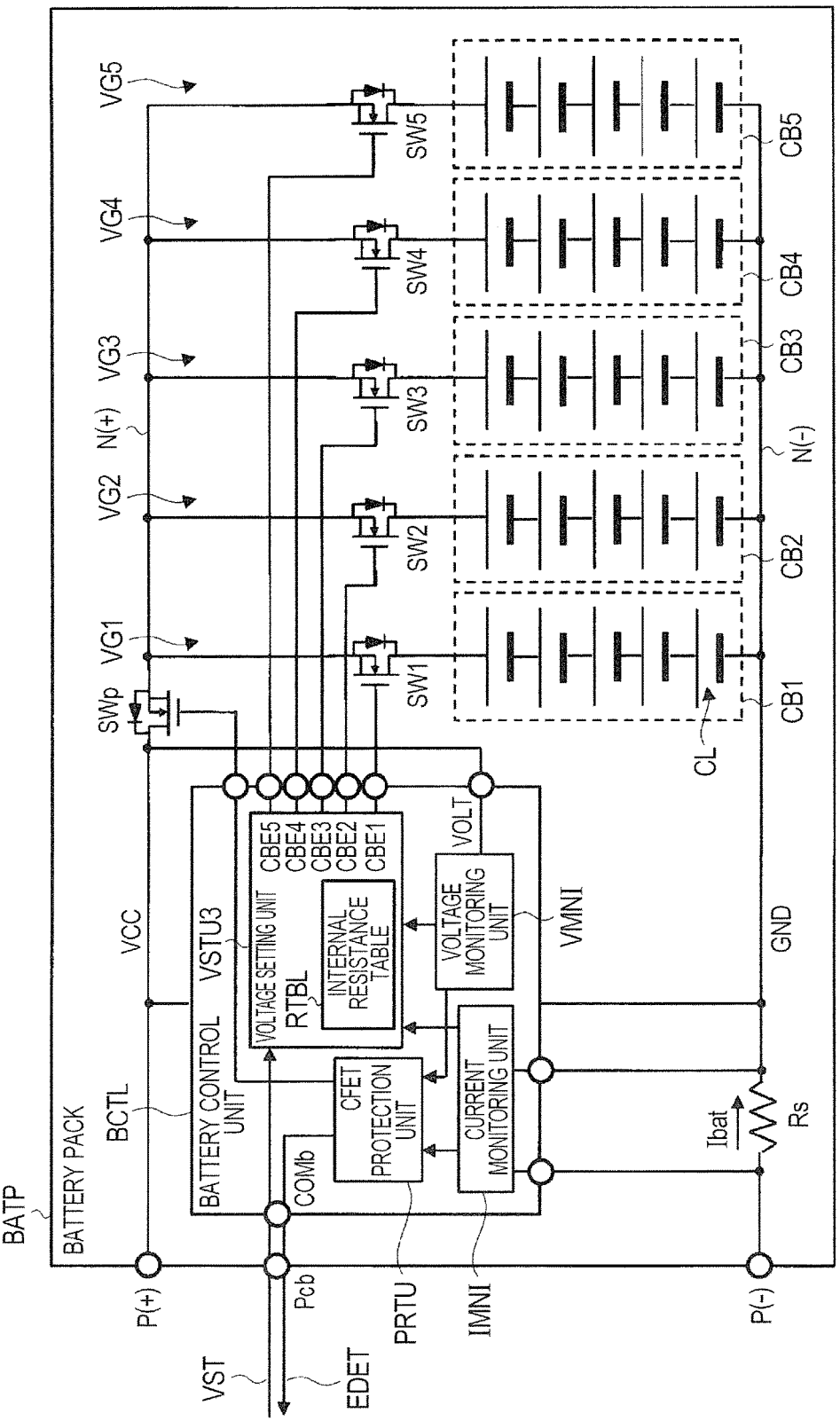
FIG. 12 is a block diagram illustrating a configuration example of a battery pack in a motor driving system according to a third embodiment of the present invention.

FIG. 12 is a block diagram illustrating a configuration example of a battery pack in a motor driving system according to a third embodiment of the present invention. FIG. 13A is a schematic diagram illustrating a structure example of an internal resistance table in FIG. 12, and FIG. 13B is an explanatory diagram illustrating an operation example of a voltage setting unit in FIG. 12. The battery pack BATP illustrated in FIG. 12 is different from the configuration example of FIG. 4 with respect to the configuration of the voltage setting unit VSTU3. The voltage setting unit VSTU3 in FIG. 12 has an internal resistance table RTBL.

As illustrated in FIG. 13A, the internal resistance table RTBL holds an internal resistance value of each of the cell blocks CB1 to CB5. For example, the voltage setting unit VSTU3 can measure the internal resistance values in advance and store the measurement results in the internal resistance table RTBL. Consequently, when the voltage instruction signal VST is supplied, the voltage setting unit VSTU3 can determine the number of switches SW which are controlled to be on based on the internal resistance value in the internal resistance table RTBL.

More specifically, the voltage setting unit VSTU3 can recognize the current value by a monitor result of the battery current Ibat from the current monitoring unit IMNI or a current instruction signal (not illustrated) supplied to the control terminal COMb. The voltage setting unit VSTU3 can estimate the correspondence relation between the number of switches SW which are controlled to be on and the bus voltage VCC on the basis of the current value, the internal resistance value in the internal resistance table, and the present bus voltage VCC from the voltage monitoring unit VMNI. It enables the voltage setting unit VSTU3 to determine the bus voltage VCC in short period by, as illustrated in FIG. 13B, receiving the voltage instruction signal VST and changing, for example, the number of switches SW which are controlled to be on from five (SW1 to SW5) to three (for example, SW1 to SW3).

Internal Resistance Measuring Method

Figure 14B:
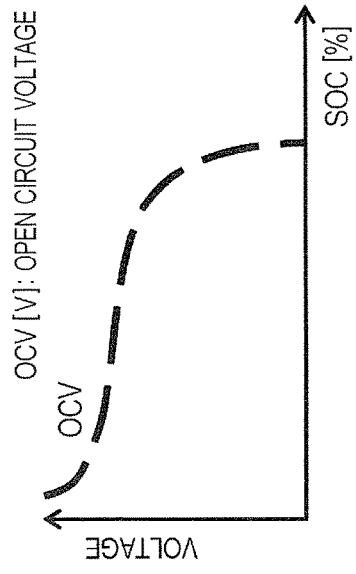
FIGS. 14A, 14B, and 14C are diagrams for explaining an example of a method of measuring internal resistance by the voltage setting unit in FIG. 12.
Figure 14A:
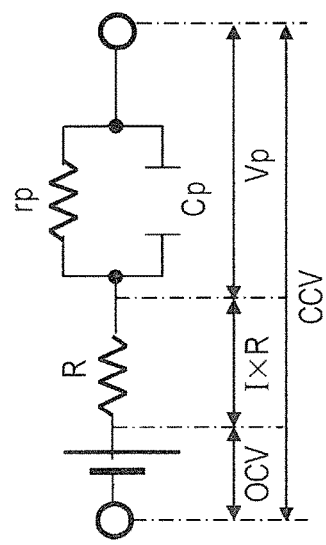
Figure 14C:
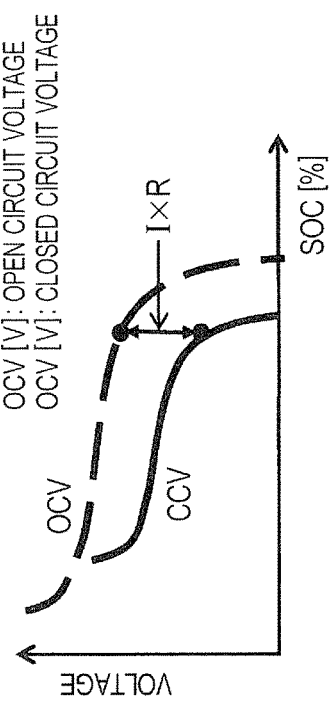

FIGS. 14A, 14B, and 14C are diagrams for explaining an example of a method of measuring internal resistance by the voltage setting unit in FIG. 12. As illustrated in FIG. 14A, the cell block CB can be expressed by an equivalent circuit in which OCV (Open Circuit Voltage) in a state where no charging/discharging is performed, an internal resistor R, and a parallel circuit of polarization resistance rp and a capacitance component Cp are coupled in series. When current flowing in the cell block CB is set as I, voltage CCV across terminals of the cell block CB can be expressed as "CCV=OCV+I×R+Vp". Vp denotes polarization voltage.

On the other hand, the battery remaining amount (SOC: State Of Charge) and OCV have a relation as illustrated in FIG. 14B. In the voltage CCV across the terminals, as illustrated in FIG. 14C, a voltage drop of the amount of "I×R" occurs immediately after the cell block CB is discharged. The voltage setting unit VSTU3 preliminarily holds OCV in a state where no charging/discharging is performed as data and can calculate the resistance value of the internal resistor R by OCV according to the battery remaining amount (SOC), CCV obtained from the monitor result of the voltage monitoring unit VMNI, and the current I obtained from the monitor result of the current monitoring unit IMNI.

Although the voltage setting unit VSTU3 measures the internal resistance, depending on circumstances, the internal resistance can be measured in advance by another measuring device and the measured data can be stored in the internal resistance table RTBL. The method of the third embodiment can be also used in combination with the method of the first embodiment. Specifically, there is the possibility that the internal resistance fluctuates according to the environment, the degree of deterioration, and the like of the cell CL, and there may be a case that setting precision of the bus voltage VCC cannot be sufficiently maintained only by the method of the third embodiment. For example, it is also possible to perform coarse adjustment of the bus voltage VCC by using the method of the third embodiment and perform fine adjustment of increasing/decreasing the number of switches SW which are controlled to be on as necessary by using the method of the first embodiment.

By using the method of the third embodiment, in addition to the various effects described in the first embodiment, the bus voltage VCC from the battery pack BATP can be variable-controlled at high speed.

Fourth Embodiment

Application Example of Motor Driving System

Figure 15:
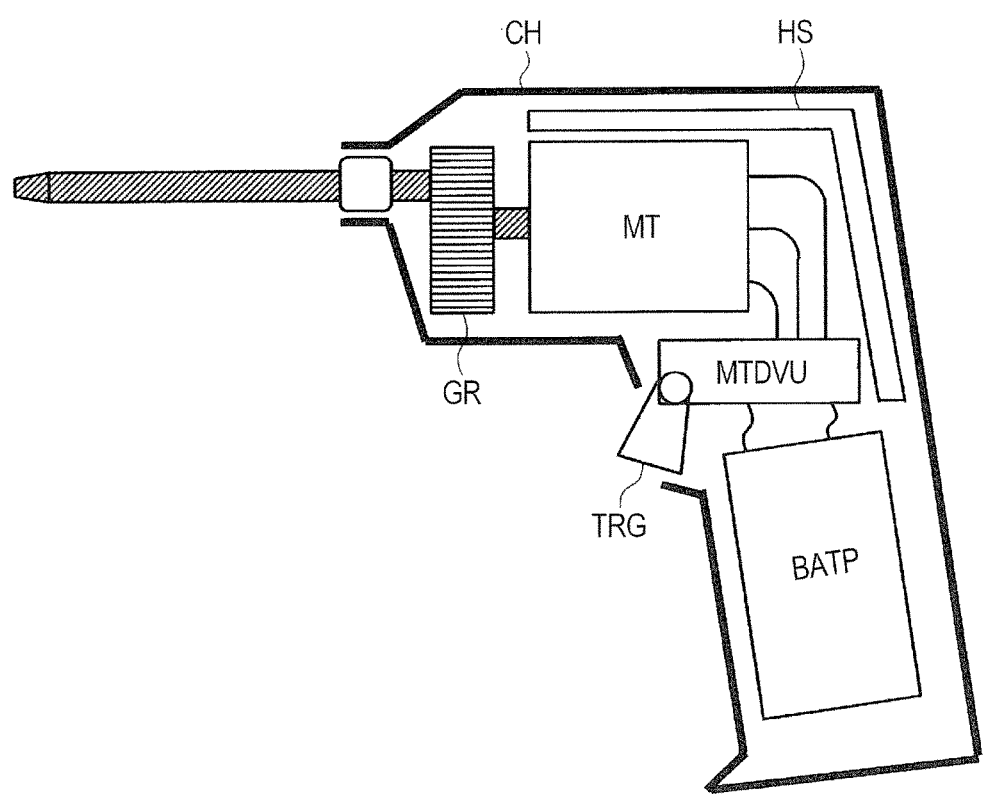
FIG. 15 is a cross section illustrating a structure example of an electric power tool as an application example in a motor driving system according to a fourth embodiment of the present invention.

FIG. 15 is a cross section illustrating a structure example of an electric power tool as an application example in a motor driving system according to a fourth embodiment of the present invention. An electric power tool illustrated in FIG. 15 has, in a chassis CH, the battery pack BATP, the motor driving unit MTDVU, and the motor MT illustrated in FIG. 1 and, in addition, has a gear mechanism GR and a heat dissipation mechanism HS. Further, the electric power tool has a trigger switch TRG for instructing the rotational speed of the motor MT.

The gear mechanism GR converts the rotational speed of the motor (for example, three-phase brushless DC motor) MT at a predetermined gear ratio and rotates a drill or the like. The trigger switch TRG is a mechanism which is a base of the speed instruction signal REF in FIG. 1 and converts the degree of pull into an electric signal. The motor control unit MCTL in the motor driving unit MTDVU receives the electric signal as the speed instruction signal REF.

In such an electric power tool, heat generation occurs due to a switching loss in the inverter unit IVU in the motor driving unit MTDVU or the like. In many cases, the motor control unit MCTL in the motor driving unit MTDVU and the battery control unit BCTL in the battery pack BATP have a temperature sensor for detecting heat generation. When abnormal heat generation is detected, a control of stopping the motor MT is performed for safety. In this case, the electric power tool cannot be used until the heat decreases and it may cause deterioration in work efficiency. On the other hand, as a heat dissipation measure of the inverter unit IVU, there is a case that the electric power tool is provided with the heat dissipation mechanism HS. The heat dissipation mechanism HS is, however, a factor of cost rise in the electric power tool.

When the method of any of the foregoing embodiments is used in such circumstances, power can be saved, so that heat generation can be reduced. As a result, a situation that the work is interrupted by heat generation can be suppressed and use time of the battery pack BATP also increases, so that the work efficiency can be improved. Further, in some cases, by eliminating the heat dissipation mechanism HS, the cost of the electric power tool can be also reduced.

Although the electric power tool is described as an application example, obviously, the present invention is not limited to the electric power tool and can be similarly applied to a product which drives the motor MT using the cells CL coupled in parallel as an electromotive force, and similar effects can be obtained. For example, the invention can be applied to small home appliances such as an electric shaver, an electric toothbrush, and an electric toy, relatively-large home appliances such as a cleaner and a power-assisted bicycle, and the like. In many cases, the number of cells CL coupled in parallel increases as the size of a relatively-large product becomes larger, and the effects of the embodiment can be obtained more conspicuously.

Although the invention achieved by the inventors of the present invention has been concretely described on the basis of the embodiments, the present invention is not limited to the embodiments but can be variously changed without departing from the gist. For example, the foregoing embodiments have been specifically described to explain the present invention so as to be easily understood. The present invention is not limited to an embodiment having all of the configurations described. A part of the configurations in an embodiment can be replaced by a configuration in another embodiment. A configuration of an embodiment can be added to a configuration in another embodiment. To a part of configurations in each of the embodiments, another configuration can be added. A part of the configurations in each of the embodiments can be deleted or replaced.

What is claimed is:

1. A motor driving method using:
    a battery pack including a plurality of cells coupled in parallel and outputting a bus voltage to a positive voltage node using a negative voltage node as a reference voltage;
    an inverter unit including a plurality of transistors to which the bus voltage is supplied, converting the bus voltage to an AC voltage by switching the transistors in accordance with a PWM signal, and driving a motor by the AC voltage; and
    a motor control unit generating the PWM signal,
    wherein the motor control unit outputs a voltage instruction signal for instructing the bus voltage toward the battery pack, and
    wherein the battery pack variably controls the number of cells coupled in parallel between the positive voltage node and the negative voltage node so that the bus voltage according to the voltage instruction signal is obtained.

2. The motor driving method according to claim 1, wherein the motor control unit gives an instruction of decreasing the bus voltage by the voltage instruction signal to lower switching frequency of the PWM signal on the basis of a decrease width of the bus voltage.

3. The motor driving method according to claim 2, wherein when a control width of duty of the PWM signal is narrower than a predetermined value, the motor control unit gives an instruction of decreasing the bus voltage by the voltage instruction signal.

4. The motor driving method according to claim 1,
    wherein the battery pack comprises: a plurality of voltage generating units coupled in parallel between the positive voltage node and the negative voltage node; and a battery control unit,
    wherein each of the voltage generating units comprises the cell and a first switch coupled to the cell in series, and
    wherein the battery control unit controls on/off of the first switch in accordance with the voltage instruction signal.

5. The motor driving method according to claim 4, wherein the battery control unit changes the number of the first switches which are controlled to be on one by one while monitoring the bus voltage until the bus voltage becomes magnitude according to the voltage instruction signal.

6. The motor driving method according to claim 4, wherein the battery control unit preliminarily measures an internal resistance value of the cell in each of the voltage generating units and, when the voltage instruction signal is input, determines the number of the first switches which are controlled to be on, on the basis of the internal resistance value.

7. A battery pack comprising:
a positive power supply terminal outputting a bus voltage;
a negative power supply terminal outputting a reference voltage as a reference of the bus voltage;
a positive voltage node coupled to the positive power supply terminal;
a negative voltage node coupled to the negative power supply terminal; and
a plurality of voltage generating units coupled in parallel between the positive voltage node and the negative voltage node,
wherein each of the voltage generating units comprises a cell generating a predetermined voltage, and
wherein at least one of the voltage generating units comprises a first switch coupled in series to the cell.

8. The battery pack according to claim 7, further comprising:
a control terminal to which a voltage instruction signal for instructing the bus voltage is supplied; and
a battery control unit variable-controlling the bus voltage by controlling on/off of the first switch in accordance with the voltage instruction signal.

9. The battery pack according to claim 8, wherein the first switch is provided in each of the voltage generating units.

10. The battery pack according to claim 9, wherein the battery control unit changes the number of first switches which are controlled to be on one by one while monitoring the bus voltage until the bus voltage becomes magnitude according to the voltage instruction signal.

11. The battery pack according to claim 9, wherein the battery control unit preliminarily measures an internal resistance value of the cell in each of the voltage generating units and, when the voltage instruction signal is input, determines the number of the first switches which are controlled to be on, on the basis of the internal resistance value.

12. The battery pack according to claim 9, wherein the battery control unit monitors a remaining amount of the cell in each of the voltage generating units, controls the first switch corresponding to the cell whose remaining amount is large from an off state to an on state at a predetermined timing and, after that, controls the first switch corresponding to the cell whose remaining amount is small from the on state to the off state.

13. The battery pack according to claim 12, wherein each of the voltage generating units further comprises a diode whose cathode is coupled to the positive voltage node and whose anode is coupled to the negative voltage node via a series coupling circuit of the switch and the cell.

14. The battery pack according to claim 8, further comprising a second switch inserted between the positive voltage node and the positive power supply terminal or between the negative voltage node and the negative power supply terminal,
wherein the battery control unit monitors presence/absence of abnormality in the bus voltage or bus current and controls on/off of the second switch in accordance with the monitor result.

15. A semiconductor device controlling a battery outputting a bus voltage using a reference voltage as a reference,
wherein the battery comprises a plurality of voltage generating units coupled in parallel between a positive voltage node coupled to the bus voltage and a negative voltage node coupled to the reference voltage,
wherein each of the voltage generating units comprises a cell generating a predetermined voltage and a first switch coupled in series to the cell, and
wherein the semiconductor device comprises:
a control terminal to which a voltage instruction signal for instructing the bus voltage is supplied;
a plurality of enable terminals coupled to the first switches in the voltage generating units; and
a voltage setting unit variable-controlling the bus voltage by controlling on/off of the first switches via the enable terminals in accordance with the voltage instruction signal.

16. The semiconductor device according to claim 15,
wherein the battery further comprises a second switch inserted between a positive power supply terminal of the battery and the positive voltage node or between a negative power supply terminal of the battery and the negative voltage node, and
wherein the semiconductor device further comprises:
a voltage monitoring unit monitoring the bus voltage;
a current monitoring unit monitoring bus current; and
a protection unit controlling on/off of the second switch in accordance with presence/absence of abnormality in the bus voltage or the bus current.

17. The semiconductor device according to claim 16, wherein the voltage setting unit changes the number of first switches which are controlled to be on one by one while monitoring the bus voltage via the voltage monitoring unit until the bus voltage becomes magnitude according to the voltage instruction signal.

18. The semiconductor device according to claim 16, wherein the voltage setting unit preliminarily measures an internal resistance value of the cell in each of the voltage generating units and, when the voltage instruction signal is input, determines the number of first switches which are controlled to be on, on the basis of the internal resistance value.

19. The semiconductor device according to claim 16, further comprising:
a remaining amount monitoring unit monitoring remaining amount of the cell in each of the voltage generating units; and
a cell balance control unit controlling the first switch corresponding to the cell whose remaining amount is large from an off state to an on state at a predetermined timing and, after that, controlling the first switch corresponding to the cell whose remaining amount is small from the on state to the off state.

20. The semiconductor device according to claim 19, wherein the semiconductor device is a microcontroller chip.

* * * * *